(12) United States Patent
Xiang et al.

(10) Patent No.: US 12,120,700 B2
(45) Date of Patent: Oct. 15, 2024

(54) COMMUNICATION METHOD AND APPARATUS

(71) Applicant: HUAWEI TECHNOLOGIES CO., LTD., Guangdong (CN)

(72) Inventors: Zhengzheng Xiang, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 17/684,220

(22) Filed: Mar. 1, 2022

(65) Prior Publication Data

US 2022/0272742 A1    Aug. 25, 2022

Related U.S. Application Data

(63) Continuation of application No. PCT/CN2020/113061, filed on Sep. 2, 2020.

(30) Foreign Application Priority Data

Sep. 2, 2019  (CN) .......................... 201910824680.1

(51) Int. Cl.
*H04W 72/23*  (2023.01)
*H04L 5/00*  (2006.01)

(52) U.S. Cl.
CPC ........... *H04W 72/23* (2023.01); *H04L 5/0053* (2013.01)

(58) Field of Classification Search
CPC ... H04L 5/0023; H04L 5/0053; H04L 5/0033; H04L 5/0091; H04L 1/1858; H04L 5/0064; H04W 72/23
See application file for complete search history.

(56) References Cited

U.S. PATENT DOCUMENTS

2013/0107848 A1  5/2013 Kang et al.
2018/0145805 A1  5/2018 Maaref
(Continued)

FOREIGN PATENT DOCUMENTS

CN  103974420 A  8/2014
CN  108512576 A  9/2018
(Continued)

OTHER PUBLICATIONS

Huawei, HiSilicon, "Discussion on sidelink resource allocation mode 1," 3GPP TSG RAN WG1 Meeting #96bis, R1-1903950, Xi'an, China, Apr. 8-12, 2019, 8 pages.
(Continued)

*Primary Examiner* — Syed Ali
(74) *Attorney, Agent, or Firm* — Fish & Richardson P.C.

(57) ABSTRACT

The present disclosure provides example communication methods and apparatuses. One example communication method includes generating first scheduling information and second scheduling information by a network device, where the first scheduling information indicates a downlink transmission parameter and a downlink time-frequency resource that are used by a target terminal device and at least one cooperation terminal device to receive first data from the network device, the second scheduling information indicates a sidelink transmission parameter and a sidelink time-frequency resource that are used by the at least one cooperation terminal device to send second data to the target terminal device, the second data is generated based on the first data. The downlink control information is sent by the network device to the target terminal device and the at least one cooperation terminal device, where the downlink control information includes the first scheduling information and the second scheduling information.

16 Claims, 10 Drawing Sheets

(56) References Cited

U.S. PATENT DOCUMENTS

| | | | |
|---|---|---|---|
| 2019/0364588 A1* | 11/2019 | Lu | H04L 1/1887 |
| 2019/0373652 A1* | 12/2019 | Hong | H04W 76/14 |
| 2020/0007297 A1* | 1/2020 | Hong | H04W 28/04 |
| 2020/0178221 A1* | 6/2020 | Byun | H04W 72/23 |
| 2020/0205165 A1* | 6/2020 | Huang | H04L 1/1854 |
| 2021/0050950 A1* | 2/2021 | Zhou | H04W 76/14 |
| 2021/0136783 A1* | 5/2021 | Fakoorian | H04W 76/14 |
| 2021/0298030 A1* | 9/2021 | Li | H04L 5/0048 |
| 2021/0321380 A1* | 10/2021 | Zhao | H04L 1/1896 |
| 2021/0385845 A1* | 12/2021 | Zhao | H04W 72/569 |
| 2021/0400636 A1* | 12/2021 | Seo | H04L 5/0055 |

FOREIGN PATENT DOCUMENTS

| | | |
|---|---|---|
| CN | 109565488 A | 4/2019 |
| CN | 109565853 A | 4/2019 |
| CN | 109729594 A | 5/2019 |
| EP | 3629652 A1 | 4/2020 |
| EP | 3681232 A1 | 7/2020 |
| WO | 2019001409 A1 | 1/2019 |
| WO | 2019080486 A1 | 5/2019 |

OTHER PUBLICATIONS

Huawei, HiSilicon, "Support for UE Cooperation in NR," 3GPP TSG RAN WG1 Meeting #85, R1-164379, Nanjing, China, May 23-27, 2016, 7 pages.

PCT International Search Report and Written Opinion issued in International Application No. PCT/CN2020/113061 on Nov. 30, 2020, 18 pages (with English translation).

Extended European Search Report issued in European Application No. 20860206.0 on Sep. 20, 2022, 9 pages.

\* cited by examiner

| DCI | | | |
|---|---|---|---|
| Field corresponding to a downlink time-frequency resource | Field corresponding to a downlink transmission parameter | Field corresponding to a sidelink transmission parameter | Field corresponding to a sidelink time-frequency resource |

FIG. 4a

| DCI | | |
|---|---|---|
| Field corresponding to second scheduling information | Field corresponding to a first downlink time-frequency resource | Field corresponding to a first downlink transmission parameter |

FIG. 4b

| DCI | | |
|---|---|---|
| Field corresponding to first scheduling information | Field corresponding to a first sidelink time-frequency resource | Field corresponding to a first sidelink transmission parameter |

FIG. 4c

| DCI | | | | |
|---|---|---|---|---|
| Field corresponding to first scheduling information | Field corresponding to the 1$^{st}$ scheduling sub-information | Field corresponding to the 2$^{nd}$ scheduling sub-information | ... | Field corresponding to an N$^{th}$ scheduling sub-information |

FIG. 4d

| DCI | | |
|---|---|---|
| Fourth field | First subfield | Second subfield |

| DCI | | |
|---|---|---|
| First field | Second field | Third field |

| DCI | | | |
|---|---|---|---|
| First field | Second field | Fifth field | Sixth field |

COMMUNICATION METHOD AND APPARATUS

CROSS-REFERENCE TO RELATED APPLICATIONS

This application is a continuation of International Application No. PCT/CN2020/113061, filed on Sep. 2, 2020, which claims priority to Chinese Patent Application No. 201910824680.1, filed on Sep. 2, 2019. The disclosures of the aforementioned applications are hereby incorporated by reference in their entireties.

TECHNICAL FIELD

This application relates to the field of communication technologies, and in particular, to a communication method and apparatus.

BACKGROUND

New wireless service types such as an internet of things service and an autonomous driving service pose higher requirements on a next-generation wireless communication system, namely, a 5G system. To further improve a capacity of the 5G system and network coverage, the 5G system proposes a user cooperation communication manner. Before users perform cooperation communication, a cooperation transmission group may be established for a target terminal device. The cooperation transmission group may include N cooperation terminal devices. A sidelink may be established between each cooperation terminal device and the target terminal device. In this way, when a base station sends data to the target terminal, the N cooperation terminals in the cooperation transmission group to which the target terminal belongs may also receive the foregoing data, and each cooperation terminal device may transmit the received downlink data to the target terminal device through the sidelink, so that downlink transmission performance of the target terminal device can be improved.

A user cooperation communication process may specifically include two phases.

The first phase is a downlink transmission phase. The base station sends the downlink data to the cooperation terminal devices in the cooperation transmission group to which the target terminal device belongs.

The second phase is a sidelink transmission phase. The cooperation terminal devices forward, to the target terminal device on the established sidelinks, the downlink data sent by the base station in the first phase, and the target terminal device receives, on the established sidelinks, the sidelink data sent by the cooperation terminal devices to the target terminal device.

In the current user cooperation communication process, the base station needs to send control information to the target terminal device and the cooperation terminal devices in the cooperation transmission group, to indicate a resource and a transmission parameter that are required for cooperation transmission. Consequently, control signaling resource overheads of the base station may be relatively high, and a transmission resource may be occupied.

SUMMARY

This application provides a communication method and apparatus, to avoid a problem that resource consumption is relatively high and a relatively large quantity of transmission resources are occupied because a base station needs to send downlink control information for a plurality of times in a user cooperation communication process.

According to a first aspect, a communication method is provided. A network device generates first scheduling information and second scheduling information. The first scheduling information indicates a downlink transmission parameter and a downlink time-frequency resource that are used by a target terminal device and at least one cooperation terminal device to receive first data from the network device, the second scheduling information indicates a sidelink transmission parameter and a sidelink time-frequency resource that are used by the at least one cooperation terminal device to send second data to the target terminal device, the target terminal device and the at least one cooperation terminal device belong to one cooperation transmission group, and the second data is generated based on the first data.

The network device sends downlink control information to the target terminal device and the at least one cooperation terminal device, where the downlink control information includes the first scheduling information and the second scheduling information.

According to the method provided in this embodiment of this application, the first scheduling information for downlink transmission and the second scheduling information for sidelink transmission are included in same downlink control information, so that the network device does not need to send a plurality of pieces of downlink control information, resource overheads can be reduced, and transmission resources occupied by the control information are reduced. In this way, spectral efficiency can be improved.

In a possible design, the second scheduling information indicates a first sidelink transmission parameter and a first sidelink time-frequency resource, and the first sidelink transmission parameter and the first sidelink time-frequency resource are used by each of the at least one cooperation terminal device to send the second data.

In the foregoing possible design, because the network device assigns, to the at least one cooperation terminal device, a same sidelink transmission parameter and a same sidelink time-frequency resource that are used to transmit the second data, downlink control information does not need to be separately generated for each of the at least one cooperation terminal device, and only a field indicating the first sidelink transmission parameter and a field indicating the first sidelink time-frequency resource need to be carried in the downlink control information, so that time-frequency resources occupied by the downlink control information in user cooperation transmission can be reduced, and the overheads of the resources occupied by the downlink control information can be reduced. In this way, the spectral efficiency can be improved.

In a possible design, a quantity of the at least one cooperation terminal device may be N, and N is a positive integer. Correspondingly, the second scheduling information may include N pieces of scheduling sub-information, and each of the N pieces of scheduling sub-information correspondingly indicates a sidelink transmission parameter and a sidelink time-frequency resource of one of the N cooperation terminal devices.

In the foregoing possible design, the N pieces of scheduling sub-information for sidelink transmission are included in same downlink control information, so that the network device does not need to send N pieces of downlink control information to the N cooperation terminal devices, the resource overheads can be reduced, and the transmission resources occupied by the control information are reduced. In this way, the spectral efficiency can be improved.

In a possible design, the downlink control information may specifically include a first field, a second field, and a third field, where the first field indicates first common scheduling information, and the first common scheduling information is a same part in the first scheduling information and the second scheduling information; the second field indicates a part other than the first common scheduling information in the first scheduling information; and the third field indicates a part other than the first common scheduling information in the second scheduling information.

In the foregoing possible design, a common part in the first scheduling information and the second scheduling information is deduplicated, so that the overheads of the resources occupied by the downlink control information in the user cooperation transmission can be reduced. In this way, the spectral efficiency can be improved.

In a possible design, the downlink control information may specifically include a fourth field, a first subfield, and a second subfield, where the fourth field indicates the first scheduling information; the first subfield indicates second common scheduling information, and the second common scheduling information is a same part in the N pieces of scheduling sub-information; and the second subfield indicates a part other than the second common scheduling information in the N pieces of scheduling sub-information.

In the foregoing possible design, a common part in the second scheduling information is deduplicated, so that the overheads of the resources occupied by the downlink control information in user cooperation transmission can be reduced. In this way, the spectral efficiency can be improved.

In a possible design, the downlink control information may specifically include a first field, a second field, a fifth field, and a sixth field, where the first field indicates first common scheduling information, and the first common scheduling information is a same part in the first scheduling information and the second scheduling information; the second field indicates a part other than the first common scheduling information in the first scheduling information; the fifth field indicates a part other than the first common scheduling information in second common scheduling information, and the second common scheduling information is a same part in the N pieces of scheduling sub-information; and the sixth field is a part other than the first common scheduling information and the second common scheduling information in the second scheduling information.

In the foregoing possible design, a common part in the first scheduling information and the second scheduling information is deduplicated, so that the overheads of the resources occupied by the downlink control information in user cooperation transmission can be reduced. In this way, the spectral efficiency can be improved.

In a possible design, the first scheduling information and the second scheduling information may each specifically include but are not limited to one or more of the following: a modulation and coding scheme, a time-frequency resource, a multiple-input multiple-output mode, a hybrid automatic repeat request parameter, and priority information.

In a possible design, the network device may send the first data based on the foregoing downlink control information.

According to a second aspect, an embodiment of this application provides a communication method. The method includes:

A first cooperation terminal device receives downlink control information from a network device. The downlink control information includes first scheduling information and second scheduling information, the first scheduling information indicates a downlink transmission parameter and a downlink time-frequency resource that are used by a target terminal device and at least one cooperation terminal device to receive first data from the network device, the second scheduling information indicates a sidelink transmission parameter and a sidelink time-frequency resource that are used by the at least one cooperation terminal device to send second data to the target terminal device, the second data is generated based on the first data, the target terminal device and the at least one cooperation terminal device belong to one cooperation transmission group, and the first cooperation terminal device is one of the at least one cooperation terminal device. The first cooperation terminal device receives the first data from the network device based on the first scheduling information, and generates, based on the first data, the second data that needs to be sent to the target terminal device. The first cooperation terminal device sends the second data to the target terminal device based on the second scheduling information.

According to the method provided in this embodiment of this application, the first scheduling information for downlink transmission and the second scheduling information for sidelink transmission are included in same downlink control information, so that the cooperation terminal device and the target terminal device may only need to receive one piece of downlink control information on one physical downlink control channel based on one piece of downlink control information configured by the network device, to obtain the first scheduling information and the second scheduling information, and does not need to receive a plurality of pieces of downlink control information, so that processing complexity of terminal devices is reduced.

In a possible design, the method may further include: The first cooperation terminal device sends sidelink control information to the target terminal device. The sidelink control information indicates the sidelink transmission parameter and the sidelink time-frequency resource that are used by the first cooperation terminal device to the send second data to the target terminal device.

In a possible design, the first cooperation terminal device may further send the sidelink control information to the target terminal device after determining that no feedback acknowledgement message or feedback negative acknowledgement message sent by the target terminal device is obtained through monitoring within preset duration.

In a possible design, the second scheduling information may specifically indicate a first sidelink transmission parameter and a first sidelink time-frequency resource, and the first sidelink transmission parameter and the first sidelink time-frequency resource are used by the first cooperation terminal device to send the second data to the target terminal device.

In a possible design, a quantity of the at least one cooperation terminal device may be N, and N is a positive integer. Correspondingly, the second scheduling information may include N pieces of scheduling sub-information, and each of the N pieces of scheduling sub-information correspondingly indicates a sidelink transmission parameter and a sidelink time-frequency resource of one of the N cooperation terminal devices.

In a possible design, the downlink control information may specifically include a first field, a second field, and a third field, where the first field indicates first common scheduling information, and the first common scheduling information is a same part in the first scheduling information and the second scheduling information; the second field indicates a part other than the first common scheduling information in the first scheduling information; and the third field indicates a part other than the first common scheduling information in the second scheduling information.

In another possible design, the downlink control information includes a fourth field, a first subfield, and a second subfield, where the fourth field indicates the first scheduling information; the first subfield indicates second common scheduling information, and the second common scheduling information is a same part in the N pieces of scheduling sub-information; and the second subfield indicates a part other than the second common scheduling information in the N pieces of scheduling sub-information.

In still another possible design, the downlink control information includes a first field, a second field, a fifth field, and a sixth field.

The first field indicates first common scheduling information, and the first common scheduling information is a same part in the first scheduling information and the second scheduling information; the second field indicates a part other than the first common scheduling information in the first scheduling information; the fifth field indicates a part other than the first common scheduling information in second common scheduling information, and the second common scheduling information is a same part in the N pieces of scheduling sub-information; and the sixth field indicates a part other than the first common scheduling information and the second common scheduling information in the second scheduling information.

In a possible design, the first scheduling information and the second scheduling information may each include but are not limited to one or more of the following: a modulation and coding scheme, a time-frequency resource, a multiple-input multiple-output mode, a hybrid automatic repeat request parameter, and priority information.

According to a third aspect, an embodiment of this application provides a communication method. A target terminal device receives downlink control information from a network device. The downlink control information includes first scheduling information and second scheduling information, the first scheduling information indicates a downlink transmission parameter and a downlink time-frequency resource that are used by the target terminal device and at least one cooperation terminal device to receive first data from the network device, the second scheduling information indicates a sidelink transmission parameter and a sidelink time-frequency resource that are used by the at least one cooperation terminal device to send second data to the target terminal device, and the target terminal device and the at least one cooperation terminal device belong to one cooperation transmission group. The target terminal device receives the first data from the network device based on the first scheduling information, and separately receives the second data from the at least one cooperation terminal device based on the second scheduling information. The second data is generated by the at least one cooperation terminal device based on the received first data.

According to the method provided in this embodiment of this application, the first scheduling information for downlink transmission and the second scheduling information for sidelink transmission are included in same downlink control information, so that the cooperation terminal device and the target terminal device only need to receive one piece of downlink control information on one physical downlink control channel, to obtain the first scheduling information and the second scheduling information, and does not need to receive a plurality of pieces of downlink control information, so that processing complexity of terminal devices is reduced.

In a possible design, the method further includes:
The target terminal device receives the first data from the network device based on the first scheduling information.

In a possible design, the second scheduling information indicates a first sidelink transmission parameter and a first sidelink time-frequency resource, and the first sidelink transmission parameter and the first sidelink time-frequency resource are used by the target terminal device to receive the second data from a first cooperation terminal device.

In a possible design, a quantity of the at least one cooperation terminal device is N, N is a positive integer, the second scheduling information may specifically include N pieces of scheduling sub-information, and each of the N pieces of scheduling sub-information correspondingly indicates a sidelink transmission parameter and a sidelink time-frequency resource of one of the N cooperation terminal devices.

In a possible design, the downlink control information may specifically include a first field, a second field, and a third field, where the first field indicates first common scheduling information, and the first common scheduling information is a same part in the first scheduling information and the second scheduling information; the second field indicates a part other than the first common scheduling information in the first scheduling information; and the third field indicates a part other than the first common scheduling information in the second scheduling information.

In a possible design, the downlink control information may specifically include a fourth field, a first subfield, and a second subfield, where the fourth field indicates the first scheduling information; the first subfield indicates second common scheduling information, and the second common scheduling information is a same part in N pieces of scheduling sub-information; and the second subfield indicates a part other than the second common scheduling information in the N pieces of scheduling sub-information.

In a possible design, the downlink control information includes the first field, the second field, a fifth field, and a sixth field, where the first field indicates the first common scheduling information, and the first common scheduling information is the same part in the first scheduling information and the second scheduling information; the second field indicates the part other than the first common scheduling information in the first scheduling information; the fifth field indicates a part other than the first common scheduling information in second common scheduling information, and the second common scheduling information is a same part in N pieces of scheduling sub-information; and the sixth field indicates a part other than the first common scheduling information and the second common scheduling information in the second scheduling information.

In a possible design, the first scheduling information and the second scheduling information may each include but are not limited to one or more of the following: a modulation and coding scheme, a time-frequency resource, a multiple-input multiple-output mode, a hybrid automatic repeat request parameter, and priority information.

According to a fourth aspect, an embodiment of this application further provides a communication apparatus. The communication apparatus has a function of implementing the first cooperation terminal device in any one of the second aspect or the possible designs of the second aspect, or has a function of implementing the target terminal device in any one of the third aspect or the possible designs of the third aspect. The communication apparatus may be a terminal device, for example, a handheld terminal device or a vehicle-mounted terminal device; may be an apparatus included in the terminal device, for example, a chip; or may be an apparatus including the terminal device. A function of the foregoing terminal device may be implemented by using hardware, or may be implemented by hardware executing corresponding software. The hardware or the software includes one or more modules corresponding to the foregoing function.

The communication apparatus may also have a function of implementing the network device in any one of the first aspect or the possible designs of the first aspect. The communication apparatus may be a network device, for example, a base station; or may be an apparatus included in the network device, for example, a chip. A function of the foregoing network device may be implemented by using hardware, or may be implemented by hardware executing corresponding software. The hardware or the software includes one or more modules corresponding to the foregoing function.

In a possible design, a structure of the communication apparatus includes a processing module and a transceiver module. The processing module is configured to support the communication apparatus in performing a corresponding function in any one of the first aspect or the designs of the first aspect, performing a corresponding function in any one of the second aspect or the designs of the second aspect, or performing a corresponding function in any one of the third aspect or the designs of the third aspect. The transceiver module is configured to support communication between the communication apparatus and another communication device. For example, when the communication apparatus is the network device, the communication apparatus may send downlink control information to a target terminal device and at least one cooperation terminal device. The communication apparatus may further include a storage module. The storage module is coupled to the processing module, and stores program instructions and data that are necessary for the communication apparatus. In an example, the processing module may be a processor, a communication module may be a transceiver, and the storage module may be a memory. The memory may be integrated with the processor, or may be disposed separately from the processor. This is not limited in this application.

In another possible design, an embodiment of this application further provides a communication apparatus. A structure of the communication apparatus includes a processor, and may further include a memory. The processor is coupled to the memory, and may be configured to execute computer program instructions stored in the memory, so that the communication apparatus performs the method in any one of the first aspect or the possible designs of the first aspect, performs the method in any one of the second aspect or the possible designs of the second aspect, or performs the method in any one of the third aspect or the possible designs of the third aspect. Optionally, the communication apparatus further includes a communication interface. The processor is coupled to the communication interface. When the communication apparatus is a terminal device, the communication interface may be a transceiver or an input/output interface. When the communication apparatus is a chip included in the terminal device, the communication interface may be an input/output interface of the chip. Optionally, the transceiver may be a transceiver circuit, and the input/output interface may be an input/output circuit.

According to a fifth aspect, an embodiment of this application further provides a computer-readable storage medium, including instructions. When the instructions are run on a computer, the computer is enabled to perform the method in any possible design of the first aspect, the second aspect, or the third aspect.

According to a sixth aspect, an embodiment of this application further provides a chip system. The chip system includes a processor, and may further include a memory. The chip system is configured to implement the method in the first aspect, the second aspect, or the third aspect. The chip system may include a chip, or may include a chip and another discrete component.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be respectively disposed on different chips. A type of the memory and a manner of disposing the memory and the processor are not specifically limited in this application.

According to a seventh aspect, an embodiment of this application further provides a computer program product, including instructions. When the instructions are run on a computer, the computer is enabled to perform the method in the first aspect, the second aspect, or the third aspect.

According to an eighth aspect, an embodiment of this application provides a system. The system includes a network device configured to perform the method according to the first aspect, at least one cooperation terminal device configured to perform the method according to the second aspect, and a target terminal device configured to perform the method according to the third aspect. A cooperation transmission system may include the network device, the at least one cooperation terminal device, and the target terminal device.

BRIEF DESCRIPTION OF DRAWINGS

FIG. 4a to FIG. 4d each are an example diagram of a configuration of downlink control information according to an embodiment of this application;

DESCRIPTION OF EMBODIMENTS

Figure 1A:
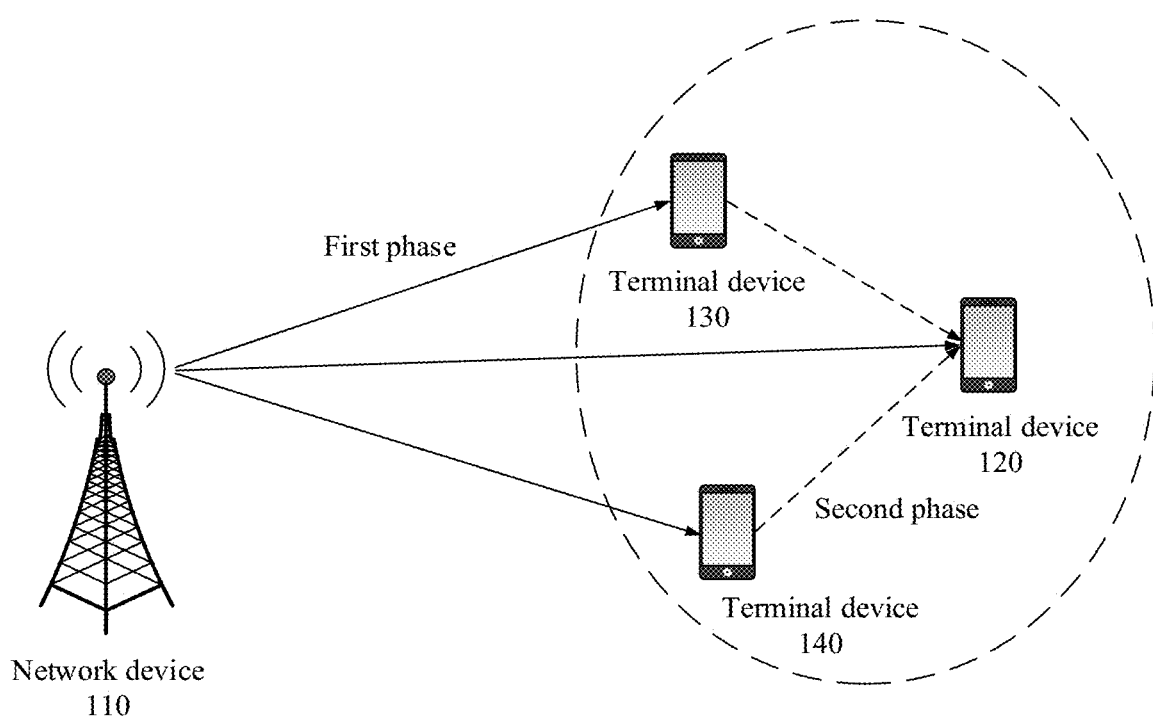
FIG. 1a and FIG. 1B each are a schematic diagram of a network architecture of a communication system used in an embodiment of this application.

The following describes the embodiments of this application with reference to the accompanying drawings.

The following explains and describes some communication nouns or terms used in this application, and the communication nouns or the terms are also used as a part of inventive content of the embodiments of this application.

1. Downlink (Downlink, DL)

The downlink is used for communication between a network device and a terminal device. The communication includes one-to-one downlink communication and one-to-many downlink communication. The one-to-one downlink communication may include unicast, and the one-to-many downlink communication includes broadcast, multicast, and the like. For example, the broadcast may refer to communication between the network device and all terminal devices in a cell, and the multicast may mean that the network device communicates with a terminal in a communication group, where the communication group includes one or more terminal devices. The downlink communication may include direct communication between the network device and the terminal device, or may include downlink communication forwarded by a relay node.

A physical channel for the downlink communication may include at least one of the following.

Physical downlink control channel (physical downlink control channel, PDCCH): The PDCCH is used to carry downlink control information (Downlink Control Information, DCI), to assign a resource of a data channel to the terminal device, where the DCI includes related information of scheduled downlink transmission, and a UE receives the downlink transmission based on the related information. For example, the control information may indicate a symbol and/or a resource block (resource block, RB) to which the data channel is mapped, and the network device and the terminal device perform data transmission on the assigned time-frequency resource through the data channel.

Physical downlink shared channel (physical downlink shared channel, PDSCH): The PDSCH is used to carry data delivered by the network device.

2. Sidelink (Sidelink, SL)

The sidelink may also be referred to as a sidelink, a sidelink, or the like. The sidelink is used for communication between terminal devices. The communication includes one-to-one sidelink communication and one-to-many sidelink communication. The one-to-one sidelink communication may include unicast, and the one-to-many sidelink communication includes broadcast, multicast, and the like. For example, the broadcast may refer to communication with all terminal devices in a cell, and the multicast may refer to communication with a terminal in a communication group, where the communication group includes one or more terminal devices. The sidelink communication may include direct communication between two terminal devices, or may include sidelink communication forwarded by a relay node.

A physical channel for the sidelink communication may include at least one of the following.

Physical sidelink shared channel (physical sidelink shared channel, PSSCH): The PSSCH is used to carry sidelink data (SL data).

Physical sidelink control channel (physical sidelink control channel, PSCCH): The PSCCH is used to carry a sidelink scheduling assignment (sidelink scheduling assignment, SL SA). The SL SA may also be referred to as sidelink control information (sidelink control information, SCI).

Physical sidelink feedback channel (physical sidelink feedback channel, PSFCH): The PSFCH is used to carry sidelink feedback control information. For example, the sidelink feedback information may include at least one of channel state information (channel state information, CSI), hybrid automatic repeat request (hybrid automatic repeat request, HARQ) information, and the like. The HARQ information may include an acknowledgement (acknowledgement, ACK), a negative acknowledgement (negative acknowledgement, NACK), or the like.

Physical sidelink broadcast channel (physical sidelink broadcast channel, PSBCH): The PSBCH is used to carry system-related information and synchronization-related information.

Physical sidelink discovery channel (physical sidelink discovery channel, PSDCH): The PSDCH is used to carry a sidelink discovery message.

3. Downlink Control Information (Downlink Control Information, DCI)

The DCI is information sent by a network device to a terminal device. For example, the network device may send the DCI through a physical downlink control channel PDCCH. The DCI may be used to schedule uplink data transmission, schedule downlink data transmission, or assign a sidelink resource. For example, a communication interface between the network device and the terminal device is a Uu interface, and uplink/downlink data transmission may be performed over the Uu interface. The uplink data transmission is data transmission from the terminal device to the network device, and the downlink data transmission is data transmission from the network device to the terminal device. A communication interface between terminal devices is a PC5 interface, sidelink transmission may be performed between the terminal devices over the PC5 interface, and the sidelink resource assignment may be used to assign the sidelink resource and/or a sidelink receiving resource. For example, in an example, the network device may send the DCI to a transmit side terminal device, where the DCI is used to assign the sidelink resource to the transmit side terminal device.

3. Resource Occupied by DCI (1) Function of the DCI: DCI having different functions may occupy different resources. The DCI in the embodiments of this application may include scheduling information assigned by a network device to a terminal device on different transmission links, for example, scheduling information used for downlink data scheduling and scheduling information used for sidelink data scheduling. Specific scheduling information may include a modulation and coding scheme MCS, a time-frequency resource, a multiple-input multiple-output MIMO mode, a hybrid automatic repeat request HARQ parameter, priority information, and the like.

(2) Format of the DCI: DCI in different formats includes different information fields. For example, DCI used for downlink data scheduling may include a DCI format 1_0 (format 1_0) and/or a DCI format 1_1 (format 1_1), and DCI corresponding to sidelink data scheduling may include a DCI format 5 (format 5) and/or a DCI format 5A (format 5A).

(3) Search space SS: The network device configures the terminal device to monitor the DCI in different SS. For example, the network device may configure the terminal device to monitor the DCI in common search space (common search space, CS S), or may configure the terminal device to monitor the DCI in UE-specific search space (UE-specific search space, USS). Optionally, the USS may also be referred to as UESS.

(4) A radio network temporary identifier (radio network temporary identity, RNTI): Cyclic redundancy check (cyclic redundancy check, CRC) scrambling may be performed on scheduling information by using different RNTIs. For example, for a format of DCI having a general function, because scheduling types obtained through subdivision of the format are different, RNTIs for CRC scrambling of the DCI are different. For example, based on different scheduling types, the scheduling information used for downlink data scheduling may be classified into scheduling information used for downlink system message scheduling, scheduling information used for downlink paging message scheduling, scheduling information used for downlink dynamic data scheduling, and scheduling information used for semi-persistent scheduling. The scheduling information used for downlink system message scheduling may be scrambled by using a system information RNTI (System information RNTI, SI-RNTI), and the scheduling information used for downlink paging message scheduling may be scrambled by using a paging RNTI (Paging RNTI, P-RNTI). The scheduling information used for downlink dynamic data scheduling may be scrambled by using a cell RNTI (Cell RNTI, C-RNTI), the scheduling information used for semi-persistent data scheduling may be scrambled by using a configured scheduling RNTI (Configured Scheduling RNTI, CS-RNTI), and so on.

In the embodiments of this application, the network device may configure the DCI in the different formats. In the embodiments of this application, the network device or a CUE may use the following manner. For example, functions of first DCI in different formats may be different. For example, DCI in a first format may be referred to as fallback DCI (fall back DCI) or the like. The fallback DCI may be used for data scheduling performed before RRC connection establishment or data scheduling performed after RRC connection establishment. First DCI in a second format may be referred to as non-fallback DCI (non-fall back DCI). The non-fallback DCI may be used for data scheduling performed after RRC connection establishment.

TABLE 1

Description of a format of DCI

| Format of the DCI | Function | Search space |
| --- | --- | --- |
| Format 1_0 | Downlink data scheduling | CSS and/or USS |
| Format 1_1 | Downlink data scheduling | USS |
| Format X | SL resource scheduling | |

For example, if the network device configures the CUE to monitor the DCI in the first format, for example, the DCI in the first format may be DCI in the format 1_0 (format 1_0), the CUE may set SCI to the first format.

For example, if the network device configures the CUE to monitor the DCI in the second format, for example, the DCI in the second format may be DCI in the format 1_1 (format 1_1), the CUE may set SCI to the second format.

In the embodiments of this application, cyclic redundancy check (cyclic redundancy check, CRC) scrambling may be performed on the DCI by using different radio network temporary identifiers (radio network temporary identity, RNTI). In addition, scrambling by using the different RNTIs may be used to identify different CUEs.

The foregoing descriptions are merely examples of this application, and are not intended to limit the embodiments of this application. In the embodiments of this application, other factors may affect content of the DCI, and are not enumerated herein one by one.

In the embodiments of this application, "at least one" means one or more, and "a plurality of" means two or more than two. "And/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following" or a similar expression thereof indicates any combination of these items, including a single item or any combination of plural items. For example, at least one of a, b, and c may represent: a, b, c, a and b, a and c, b and c, or a, b, and c, where a, b, and c may be singular or plural.

Figure 1B:
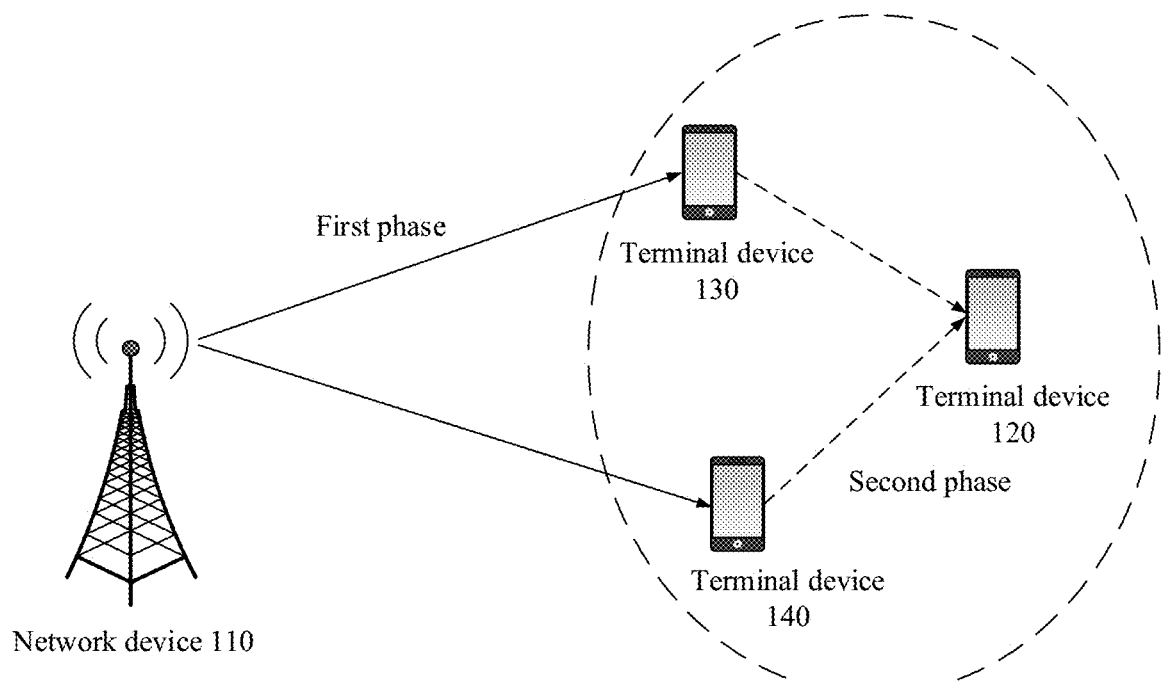

FIG. 1a and FIG. 1B each show one of communication systems 100 used in the embodiments of this application. A method provided in the embodiments of this application may be applied to various communication systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WIMAX) communication system, and a 5th generation (5th generation, 5G) system or a new radio (new radio, NR) system, a communication system used in the future or another similar communication system, and the like. Further, the embodiments of this application may alternatively be applied to an evolved universal mobile telecommunications system terrestrial radio access network (evolved universal mobile telecommunications system terrestrial radio access network, E-UTRAN) system or a next generation (next generation, NG)-RAN system, or may be applied to a next generation communication system or a similar communication system. The embodiments of this application may alternatively be used for a V2X network. V2X communication is communication between a vehicle and anything outside, and includes V2V communication, V2P communication, V2I communication, V2N communication, and the like. The embodiments of this application may alternatively be used for another internet of vehicles, a device-to-device (device-to-device, D2D) network, or the like. V2X specifically further includes several application requirements such as vehicle-to-vehicle (vehicle-to-vehicle, V2V), vehicle-to-infrastructure (vehicle-to-infrastructure, V2I), and vehicle-to-pedestrian (vehicle-to-pedestrian, V2P) direct communication, and vehicle-to-network (vehicle-to-network, V2N) communication interaction, V2V refers to communication between vehicles. V2P refers to communication between a vehicle and a person (including a pedestrian, a bicycle rider, a driver, or a passenger). V2I refers to communication between a vehicle and a network device such as an RSU. In addition, V2N may be included in V2I. V2N refers to communication between a vehicle and a base station/a network.

The communication system 100 may include at least one network device 110. The network device 110 may be a device, for example, a base station or a base station controller, that communicates with a terminal device. Each network device 110 may provide communication coverage for a specific geographical area, and may communicate with a terminal device located in the coverage area (a cell).

The network device 110 includes, for example, an access network (access network, AN) device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to mutually convert a received over-the-air frame and an internet protocol (IP) packet, and serve as a router between the terminal device and other parts of the access network, where the other parts of the access network may include an IP network. The RSU may be a fixed infrastructure entity that supports a vehicle-to-everything (vehicle-to-everything, V2X) application, and may exchange messages with another entity that supports the V2X application. The access network device may further coordinate attribute management of the air interface. For example, the access network device may include an evolved NodeB (NodeB, eNB, or e-NodeB, evolutional Node B) in an LTE system or long term evolution-advanced (long term evolution-advanced, LTE-A), may include a next generation NodeB (next generation node B, gNB) in a 5th generation mobile communication technology (the 5th generation, 5G) new radio (new radio, NR) system, or may include a centralized unit (centralized unit, CU) and a distributed unit (distributed unit, DU) in a cloud access network (cloud radio access network, Cloud RAN) system. This is not limited in the embodiments of this application.

Certainly, the network device may further include a core network device. However, the method provided in the embodiments of this application mainly relates to the access network device. Therefore, unless otherwise specified, "network device" described below is the access network device.

The communication system 100 further includes one or more in coverage terminal devices 120,130,140 of the network device 110. The terminal device includes a device that provides a user with voice and/or data connectivity, for example, may include a handheld device with a wireless connection function or a processing device connected to a wireless modem. The terminal device may communicate with a core network through a radio access network (radio access network, RAN), and exchange a voice and/or data with the RAN. The terminal device may include a user equipment (user equipment, UE), a wireless terminal device, a mobile terminal device, a subscriber unit (subscriber unit), a subscriber station (subscriber station), a mobile station (mobile station), a mobile station (mobile), a remote station (remote station), an access point (access point, AP), a remote terminal device (remote terminal), an access terminal device (access terminal), a user terminal device (user terminal), a user agent (user agent), a user device (user device), or the like. For example, the terminal device may include a mobile phone (or referred to as a "cellular" phone), a computer having a mobile terminal device, a portable, pocket-sized, handheld, computer built-in, or in-vehicle mobile apparatus, or a wearable intelligent device, for example, a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with relatively low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner. The terminal device in the embodiments of this application may alternatively be an in-vehicle module, an onboard component, an automotive chip, or an on board unit that is built in a vehicle as one or more components or units. The vehicle may implement the method in the embodiments of this application by using the in-vehicle module, the onboard component, the automotive chip, or the on board unit that is built in the vehicle.

By way of example rather than limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that is directly worn or integrated into clothes or an accessory of the user. The wearable device not only is a hardware device, but also is used to implement a powerful function through software support, data exchange, and cloud interaction. In a broad sense, the wearable intelligent device includes full-featured and large-sized devices that can implement all or some functions without depending on smartphones, for example, smart watches or smart glasses, and devices that focus only on a type of application function and need to work with other devices such as smartphones, for example, various smart bands, smart helmets, or smart jewelry for monitoring physical signs.

Data transmission may be performed between the network device 110 and the terminal devices 120 to 140 by using an air interface resource. The air interface resource may include at least one of a time domain resource, a frequency domain resource, or a code domain resource. Specifically, when data transmission is performed between the network device 110 and the terminal devices 120 to 140, the network device 110 may send control information to the terminal devices 120 to 140 through a control channel, for example, a physical downlink control channel (physical downlink control channel, PDCCH), to assign a resource of a data channel, for example, a physical downlink shared channel (physical downlink shared channel, PDSCH) or a physical uplink shared channel (physical uplink shared channel, PUSCH), to the terminal devices 120 to 140. For example, the control information may indicate a symbol and/or a resource block (resource block, RB) to which the data channel is mapped, and the network device 110 and the terminal devices 120 to 140 perform data transmission on the assigned time-frequency resource through the data channel. The data transmission may include downlink data transmission and/or uplink data transmission, the downlink data (for example, data carried on the PDSCH) transmission may be that the network device 110 sends data to the terminal devices 120 to 140, and the uplink data (for example, data carried on the PUSCH) transmission may be that the terminal devices 120 to 140 sends data to the network device 110. The data may be data in a broad sense, for example, may be user data, or may be system information, broadcast information, or other information.

In the communication systems shown in FIG. 1a and FIG. 1B, data transmission may further be performed between the terminal devices 120 to 140 by using a sidelink resource. Similar to the foregoing air interface resource, the sidelink resource may also include at least one of the time domain resource, the frequency domain resource, or the code domain resource. Specifically, a physical channel on which the terminal device 120 to 140 performs data transmission may include at least one of a physical sidelink shared channel (physical sidelink shared channel, PSSCH), a physical sidelink control channel (physical sidelink control channel, PSCCH), a physical sidelink feedback channel (physical sidelink feedback channel, PSFCH), or the like. The PSSCH is used to transmit data. The PSCCH is used to transmit control information such as scheduling assignment (scheduling assignment, SA) information. The PSFCH is used to transmit feedback information. For example, the feedback information may include channel state information (channel state information, CSI), an acknowledgement (acknowledgement, ACK), or a negative acknowledgement (negative acknowledgement, NACK).

FIG. 1a and FIG. 1B each show one network device and three terminal devices 120 to 140 as an example. Optionally, the communication system 100 may include a plurality of network devices, and another quantity of terminal devices may be included within coverage of one network device. This is not limited in the embodiments of this application. In addition, it may be understood that the sidelink communication in the embodiments of this application may be communication (for example, unicast) between one terminal device and the other terminal device. Alternatively, the sidelink communication may be communication (for example, multicast and broadcast) between one terminal device and a plurality of terminal devices. This is not limited in the embodiments of this application. For ease of description, in the embodiments of this application, "the sidelink communication is the communication between the terminal device and the other terminal device" is used as an example for description.

To further improve a capacity of the 5G system and network coverage, the 5G system provides a user cooperation communication manner, and user equipment cooperation is one of features mainly supported in the fifth generation mobile communication technology system. In user equipment cooperation communication, a target terminal device (Target User Equipment, TUE) and several cooperation terminal devices (Cooperation User Equipment, CUE) serving the target terminal device form one cooperation transmission group. For example, the terminal device 120, the terminal device 130, and the terminal device 140 in either of FIG. 1a and FIG. 1B form one cooperation transmission group. For example, the target terminal device is the terminal device 120, and the terminal devices 130 and 140 are the cooperation terminal devices. It should be noted that any terminal device may be a target terminal device in a cooperation transmission group centered on the terminal device, or may be a cooperation terminal device in one or more other cooperation transmission groups.

A neighboring terminal device (neighboring user equipment, NUE) of a target terminal device may be determined as a cooperation terminal device of the target terminal device in a random access manner. There may be a plurality of different cooperation transmission groups in a same cell. The cooperation terminal device in this application may be referred to as the CUE, may be referred to as a sidelink user equipment (side UE, SUE), or may be referred to as a relay user equipment (relay UE). This is not limited herein. For ease of description, in the embodiments of this application, the CUE is used as an example for description.

In LTE V2X, there are two transmission modes. One is a base station assignment mode that is defined as a mode 3 in the LTE standard, and the other one is a user selection mode that is defined as a mode 4 in the LTE standard.

The base station assignment mode is mainly applied to V2X communication in a situation in which there is network coverage. A base station centrally assigns resources based on reporting statuses of buffer status reports (buffer status report, BSR) of terminal devices in a unified manner. The base station may assign the resources in a semi-persistent scheduling (semi-persistent scheduling, SPS) mode or a dynamic mode. The user selection mode is mainly applied to V2X communication in a situation in which there is no network coverage. Because there is no unified resource management of a network device, a V2X terminal device can only select, by itself, a resource from a resource pool configured by the network device, to perform V2X communication. For example, for a cell, if a network device configures a resource pool in a unified manner, a plurality of V2X terminal devices in the cell all select resources from the resource pool. In the embodiments of this application, the base station assignment mode is used as an example for description.

Figure 1C:
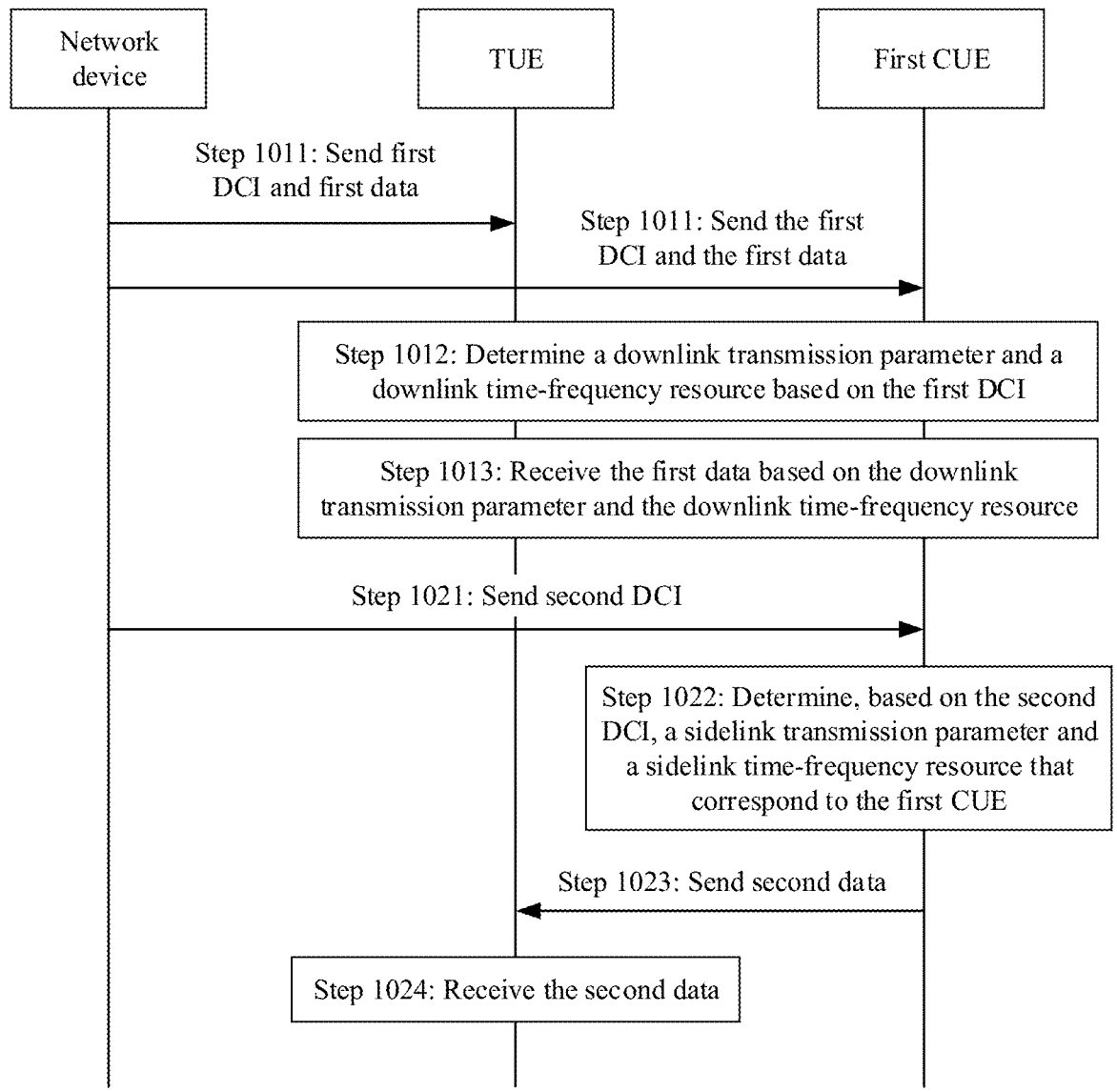
FIG. 1c is a schematic flowchart of a communication method according to an embodiment of this application.

In a possible scenario, the CUEs and the TUE are in coverage (in coverage, IC) terminal devices of a network device. Based on the communication system 100 shown in FIG. 1a, a user cooperation communication procedure is provided. A network device in the procedure may be specifically the network device 110 in FIG. 1a, a target terminal device may be the terminal device 120 in FIG. 1a, and cooperation terminal devices may be the terminal devices 130 and 140 in FIG. 1a. As shown in FIG. 1c, the procedure includes the following steps.

Transmission based on user equipment cooperation mainly includes two phases.

First phase: a downlink transmission phase

Step 1011: The network device assigns, to the CUE and the TUE, a downlink transmission parameter and a downlink time-frequency resource that are used by the network device to transmit first data to the CUE and the TUE, and sends first DCI to the CUE and the TUE.

Further, the network device sends the first data on the downlink time-frequency resource by using the downlink transmission parameter used to transmit the first data.

Specifically, the network device may send the first data to the TUE and the CUE in a multicast or broadcast manner.

The first DCI indicates the CUE and the TUE to receive the downlink transmission parameter and the downlink time-frequency resource that are used by the network device to send the first data. The downlink transmission parameter used to transmit the first data may include a modulation and coding scheme, a multiple-input multiple-output mode, a hybrid automatic repeat request parameter, priority information, and the like. For example, the network device may send, on the downlink time-frequency resource occupied by the first data, the first data by using the modulation and coding scheme and the multiple-input multiple-output mode in the downlink transmission parameter used to transmit the first data. In addition, the CUE and the TUE receive, on a time-frequency resource occupied by the first data, the first data by using a modulation and coding scheme and a multiple-input multiple-output mode in a transmission parameter used to transmit the first data. The CUE and/or the TUE send/sends a hybrid automatic repeat request feedback message based on a decoding result of the received first data and a hybrid automatic repeat request parameter in the transmission parameter, so that the network device sends retransmission data to the CUE and/or the TUE.

Step 1012: The CUE and the TUE obtain the first DCI, and determine, based on the first DCI, the downlink transmission parameter and the downlink time-frequency resource that are used by the network device to send the first data.

A specific process in which the CUE and the TUE receive the first DCI may include: The downlink transmission parameter and the downlink time-frequency resource are carried by the first DCI to be transmitted on a physical downlink control channel PDCCH. The CUE and the TUE may obtain search space SS. The SS includes a PDCCH candidate set (PDCCH candidate), and the PDCCH candidate set refers to a series of time-frequency resource locations in which PDCCHs may occur in a control resource set (control resource set, CORESET). For example, the CUE and the TUE blindly detect the first DCI in candidate search space. If parsing succeeds, the downlink transmission parameter and the downlink time-frequency resource that are carried in the first DCI and that are used to transmit the first data may be determined.

Step 1013: The TUE and the CUE receive, on the downlink time-frequency resource occupied by the first data and by using the downlink transmission parameter used to transmit the first data, the first data sent by the network device.

Specifically, the CUE and the TUE receive, on the downlink time-frequency resource occupied by the first data and by using the downlink transmission parameter used to transmit the first data, the first data sent by the network device.

For example, the network device assigns a same downlink time-frequency resource to the TUE, a CUE 1, and a CUE 2, to send the first data. The TUE, the CUE 1, and the CUE 2 simultaneously receive the first data on the downlink time-frequency resource.

Second phase: a sidelink transmission phase: Each cooperation user equipment may establish a sidelink to the target user equipment. This may be applied to a process in which the network device actively assigns a sidelink transmission resource to the terminal device, or may be applied to a process in which the network device passively assigns the sidelink transmission resource to the terminal device. A process in which the network device passively assigns the sidelink transmission resource to the terminal device may include: The terminal device sends a sidelink resource request to the network device, and the network device assigns the sidelink transmission resource to the terminal device after receiving the sidelink resource request. That is, the procedure shown in FIG. 1c may further include: The CUE sends an SL resource request to the network device.

A specific sidelink transmission process may include the following steps.

Step 1021: The network device assigns a sidelink transmission parameter and a sidelink time-frequency resource that are used to transmit second data, and sends second DCI to the CUE.

The second DCI is used to indicate the sidelink transmission parameter and the sidelink time-frequency resource that are assigned by the network device to the CUE and that are used to transmit the second data.

For example, the network device may assign a different sidelink time-frequency resource and a different sidelink transmission parameter to each CUE, or may configure a same sidelink time-frequency resource and a same sidelink transmission parameter to the CUE. There may be a plurality of pieces of second DCI. That is, the network device may configure the different sidelink time-frequency resource and/or the different sidelink transmission parameter for each CUE, and the CUE corresponds to one piece of second DCI. The network device sends each piece of second DCI to a corresponding CUE in a unicast manner, and sends all second DCI to the TUE. Alternatively, there may be one piece of second DCI. For example, the network device assigns, to each CUE, a same sidelink time-frequency resource and a same sidelink transmission parameter that are used to transmit the second data, and the network device may send the second DCI to CUEs in a multicast form. In another possible implementation, the network device may alternatively carry, in one piece of second DCI, the different sidelink time-frequency resource used to transmit the second data and/or the different sidelink transmission parameter used to transmit the second data that are/is separately configured for each CUE. The network device may send the second DCI to CUEs in a multicast form.

Step 1022: A first CUE determines, based on the second DCI, a sidelink time-frequency resource and a sidelink transmission parameter that correspond to the first CUE and that are used to transmit the second data, where the first CUE is a CUE in a cooperation transmission group.

For example, assuming that the network device sends second DCI of the CUE 1 to the CUE 1 in a unicast manner, the CUE 1 determines, based on the second DCI from the network device, the sidelink time-frequency resource and the sidelink transmission parameter that are assigned by the network device to the CUE 1 and that are used to transmit the second data. For another example, if the network device carries, in one piece of second DCI, a different sidelink time-frequency resource and a sidelink transmission parameter that are used to transmit the second data and that are separately configured for each CUE, the CUE 1 may parse only a field corresponding to the CUE 1 in the second DCI, to determine the sidelink time-frequency resource and the sidelink transmission parameter that are of the CUE 1 and that are used to transmit the second data.

Step 1023: The first CUE forwards, on the sidelink time-frequency resource corresponding to the first CUE, the second data to the TUE based on the sidelink transmission parameter corresponding to the first CUE.

For example, if both the CUE 1 and the CUE 2 correctly receive the second DCI and the first data, the CUE 1 and the CUE 2 may forward the correctly received second DCI and/or second data to the TUE. A specific forwarding manner may be an amplify-and-forward manner, a decode-and-forward manner, a compress-and-forward manner, or the like. The forwarded second data may be a part of the first data, or may be all of the first data. The CUE 1 and the CUE 2 may forward a same part in the first data, or may forward different parts in the first data. This is not limited herein. Certainly, the second data may further include a decoding result obtained by decoding the first data by the CUE, so that the TUE obtains the decoding result of the CUE, to improve data receiving performance.

In a possible implementation, the first CUE generates first SCI based on the second DCI, and sends the first SCI to the TUE.

The first SCI indicates scheduling information of a sidelink resource. For example, the SCI generated by the CUE 1 may indicate scheduling information of a sidelink resource between the CUE 1 and the TUE. The scheduling information of the sidelink may include the sidelink time-frequency resource and the sidelink transmission parameter that are in the second DCI correctly received by the CUE from the network device, or include a sidelink time-frequency resource and a sidelink transmission parameter that are determined by the CUE based on a resource pool preconfigured by the network device. Specifically, the first CUE may send the first SCI on a physical sidelink control channel PSCCH, and send the scheduling information of the sidelink resource to the TUE. Certainly, the first CUE may alternatively send scheduling assignment (scheduling assignment, SA) information to the TUE. This is not limited herein.

Step 1024: The TUE obtains the second DCI from the network device, and receives, on a corresponding sidelink transmission resource, the second data sent by the first CUE.

For example, assuming that the network device sends second DCI_CUE 1 corresponding to the CUE 1 and second DCI_CUE 2 corresponding to the CUE 2 to the TUE, the TUE receives, based on the second DCI_CUE 1 corresponding to the CUE 1, on a sidelink time-frequency resource indicated by the second DCI_CUE 1, and by using a sidelink transmission parameter indicated by the second DCI_CUE 1, the second data sent by the CUE 1, and the TUE receives, based on the second DCI_CUE 2 corresponding to the CUE 2, on a sidelink time-frequency resource indicated by the second DCI_CUE 2, and by using a sidelink transmission parameter indicated by the second DCI_CUE 2, the second data sent by the CUE 2. For another example, assuming that the second DCI generated by the network device carries the sidelink time-frequency resource and the sidelink transmission parameter of the CUE 1 and a sidelink time-frequency resource and a sidelink transmission parameter of the CUE 2, the TUE determines the sidelink time-frequency resource and the sidelink transmission parameter of the CUE 1 and the sidelink time-frequency resource and the sidelink transmission parameter of the CUE 2 based on the parsed second DCI, and then receives, by using the sidelink transmission parameter on the sidelink time-frequency resource corresponding to the CUE 1, the second data sent by the CUE 1. The TUE receives, based on second DCI corresponding to the CUE 2, on the sidelink time-frequency resource corresponding to the CUE 2, and by using the sidelink transmission parameter, the second data sent by the CUE 2.

Alternatively, the TUE obtains SCI from the CUE, and receives, on a corresponding sidelink transmission resource, the second data sent by the CUE.

For example, the TUE obtains SCI 1 from the CUE 1, and receives, on the sidelink time-frequency resource indicated by the SCI 1 and by using the sidelink transmission parameter indicated by the SCI 1, the second data sent by the CUE 1. The TUE obtains SCI 2 from the CUE 2, and receives, on a sidelink time-frequency resource indicated by the SCI 2 and by using a sidelink transmission parameter indicated by the SCI 2, the second data sent by the CUE 2.

Further, the TUE may jointly decode a signal of the first data received from the network device in the first phase, a signal of the second data that is of the CUE 1 and that is received in the second phase, and a signal of the second data that is of the CUE 2 and that is received in the second phase, to obtain the first data sent by the network device.

Through user equipment cooperation, performance of receiving, by the target terminal device, the first data sent by the network device can be improved, and reliability of receiving the first data by the target terminal device can be significantly enhanced.

Figure 1D:
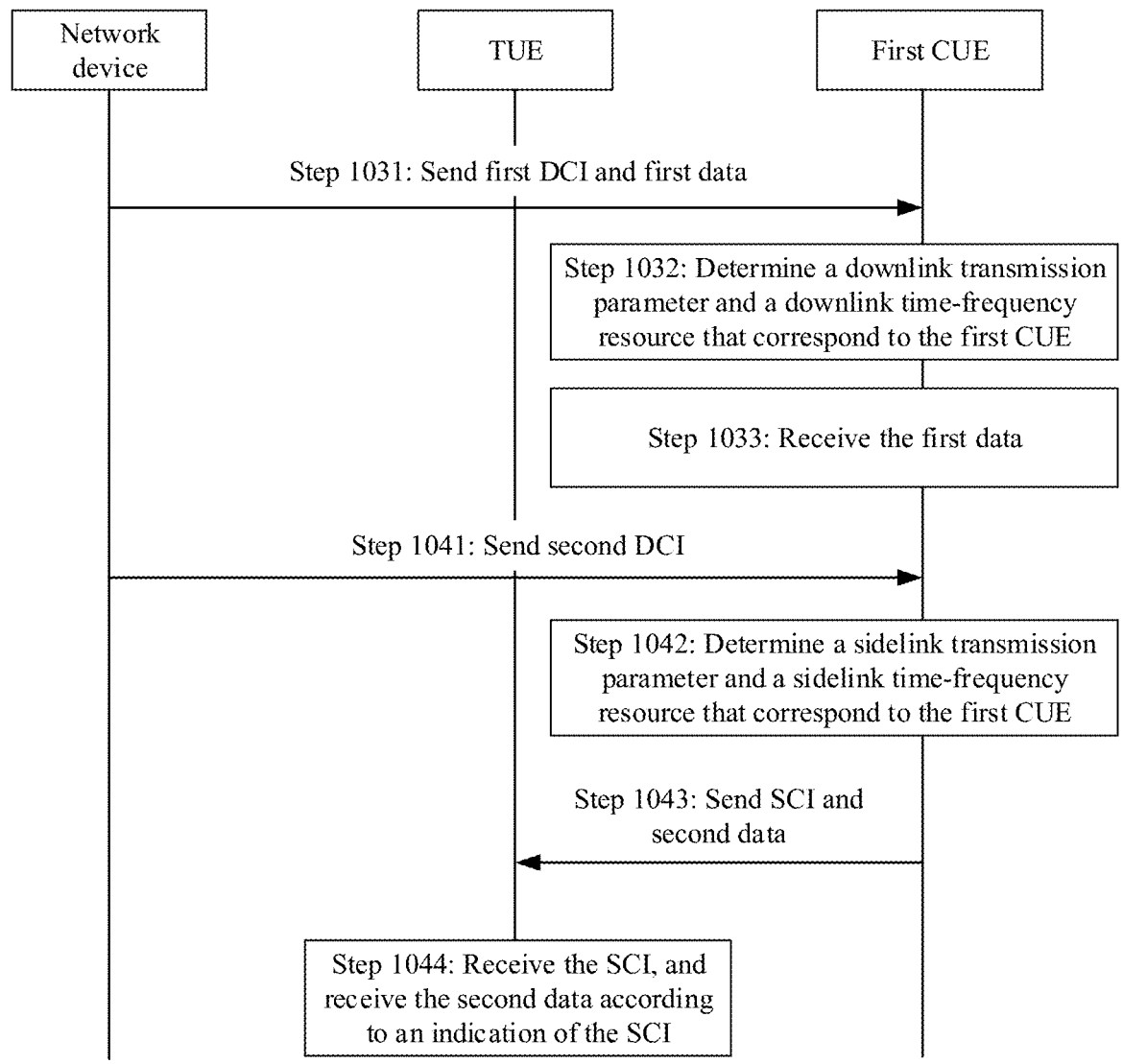
FIG. 1d is a schematic flowchart of a communication method according to an embodiment of this application.

In another possible scenario, for example, if the TUE is outside coverage of a cell or channel quality of the TUE is excessively poor, the TUE cannot receive, in a first phase, first data sent by a network device, and the first data sent by the network device can only be forwarded by the CUEs in a second phase. Based on the communication system 100 shown in FIG. 1B, a user cooperation communication procedure is provided. A network device in the procedure may be specifically the network device 110 in FIG. 1B, a target terminal device may be the terminal device 120 in FIG. 1B, and cooperation terminal devices may be the terminal devices 130 and 140 in FIG. 1B. As shown in FIG. 1d, the procedure includes the following steps.

Details may include the following.

First phase: a downlink transmission phase

Step 1031: The network device assigns, to the CUE, a downlink time-frequency resource and a downlink transmission parameter that are used to transmit first data, and sends first DCI to the CUE.

Further, the network device sends the first DCI to the CUE, and sends the first data on the downlink time-frequency resource by using the downlink transmission parameter.

Specifically, the network device may send the first data to the CUE in a multicast or broadcast manner.

The first DCI is used to indicate the downlink time-frequency resource and the downlink transmission parameter that are assigned by the network device to a terminal device in a user cooperation group and that are used to transmit the first data.

Step 1032: A first CUE determines, based on the first DCI, a downlink time-frequency resource and a downlink transmission parameter that correspond to the first CUE and that are used to transmit the first data, where the first CUE is a CUE in a cooperation transmission group.

Step 1033: The first CUE receives, on the downlink time-frequency resource corresponding to the first CUE and by using the downlink transmission parameter corresponding to the first CUE, the first data sent by the network device.

Second phase: a sidelink transmission phase

Step 1041: The network device assigns, to the first CUE, a sidelink time-frequency resource and a sidelink transmission parameter that correspond to the first CUE and that are used to transmit second data, and sends second DCI to the first CUE.

The second DCI is used to indicate the sidelink time-frequency resource and the sidelink transmission parameter that are assigned by the network device to the first CUE and that are used to transmit the second data.

For example, the network device assigns, to a CUE 1, a sidelink time-frequency resource 1 and a sidelink transmission parameter 1 that correspond to the CUE 1, generates second DCI_CUE 1 that carries the sidelink time-frequency resource 1 and the sidelink transmission parameter 1, and then sends the second DCI_CUE 1 to the CUE 1.

Likewise, the network device assigns, to a CUE 2, a sidelink time-frequency resource 2 and a sidelink transmission parameter 2 that correspond to the CUE 2, generates second DCI_CUE 2 that carries the sidelink time-frequency resource 2 and the sidelink transmission parameter 2, and then sends the second DCI_CUE 2 to the CUE 2.

Step 1042: The first CUE determines, based on the second DCI, the sidelink time-frequency resource and the sidelink transmission parameter that correspond to the first CUE and that are used to transmit the second data.

With reference to the foregoing example, the CUE 1 determines the sidelink time-frequency resource 1 and the sidelink transmission parameter 1 in the second DCI_CUE 1 based on the second DCI_CUE 1 from the network device, where the sidelink time-frequency resource 1 and the sidelink transmission parameter 1 are used to indicate the CUE 1 to send second data to the TUE on the sidelink time-frequency resource 1 by using the sidelink transmission parameter 1. The CUE 2 determines the sidelink time-frequency resource 2 and the sidelink transmission parameter 2 in the second DCI_CUE 2 based on the second DCI_CUE 2 from the network device, where the sidelink time-frequency resource 2 and the sidelink transmission parameter 2 are used by the CUE 2 to send second data to the TUE on the sidelink time-frequency resource 2 by using the sidelink transmission parameter 2.

Step 1043: The first CUE generates first SCI based on the second DCI, and sends the first SCI to the TUE.

Further, the first CUE sends the first SCI to the TUE, and sends the second data to the TUE on the sidelink time-frequency resource corresponding to the first CUE and by using the sidelink transmission parameter corresponding to the first CUE.

For example, the CUE 1 generates, based on the second DCI_CUE 1 from the network device, SCI 1 that carries the sidelink time-frequency resource 1 and the sidelink transmission parameter 1, and sends the SCI 1 to the TUE. In addition, the CUE 1 sends the second data to the TUE on the sidelink time-frequency resource 1 by using the sidelink transmission parameter 1. Likewise, the CUE 2 may generate, based on the second DCI_CUE 2 from the network device, SCI 2 that carries the sidelink time-frequency resource 2 and the sidelink transmission parameter 2, and send the SCI 2 to the TUE. In addition, the CUE 2 sends the second data to the TUE on the sidelink time-frequency resource 2 by using the sidelink transmission parameter 2.

Step 1044: The TUE obtains the first SCI, and receives, on the sidelink time-frequency resource corresponding to the first CUE and by using the sidelink transmission parameter corresponding to the first CUE, the second data sent by the CUE.

For example, the TUE obtains the SCI 1, and receives, on the sidelink time-frequency resource 1 by using the sidelink transmission parameter 1, the second data sent by the CUE 1. The TUE obtains the SCI 2, and receives, on the sidelink time-frequency resource 2 by using the sidelink transmission parameter 2, the second data sent by the CUE 2.

If the TUE receives second data sent by a plurality of CUEs, the TUE may jointly decode signals forwarded by the plurality of CUEs and received in the second phase. For example, if the TUE receives a signal 1 of the second data sent by the CUE 1 and a signal 2 of the second data sent by the CUE 2, the TUE may jointly decode the signal 1 and the signal 2, to improve accuracy of decoding the second data, and improve cooperation transmission performance.

Through user cooperation transmission, performance or reliability of the TUE can be significantly enhanced, a system capacity and network coverage can be significantly improved, and load of a network device can be reduced.

It should be noted that the foregoing procedure is merely an application scenario of this application, and is not intended to limit this application. The communication method provided in the embodiments of this application may alternatively be applied to another application scenario involving DCI.

In the foregoing embodiment, for a case in which a terminal device in user cooperation performs data transmission, two cooperation terminal devices are used as an example. Before the network device sends downlink data on a downlink transmission link, the network device sends first DCI to the target terminal device and the cooperation terminal devices. When the network device schedules the terminal device to send a sidelink signal on a sidelink transmission link, the cooperation terminal devices send second DCI to the terminal devices. Therefore, in a current user cooperation communication process, the network device needs to send a plurality of pieces of physical downlink control information PDCCHs. Resource overheads are relatively large, and a relatively large quantity of transmission resources are occupied.

In addition, to ensure compatibility between downlink air interface communication and sidelink communication, the network device may configure the CUEs to monitor two types of DCI: the first DCI and the second DCI. The first DCI is used to schedule downlink data transmission, and the second DCI is used to schedule sidelink resource assignment in the scenario shown in FIG. 1a. The CUEs need to separately perform PDCCH blind detection at each PDCCH candidate location, and two pieces of DCI need to be blindly detected at least twice, and processing complexity of the terminal devices is relatively high.

Figure 2A:
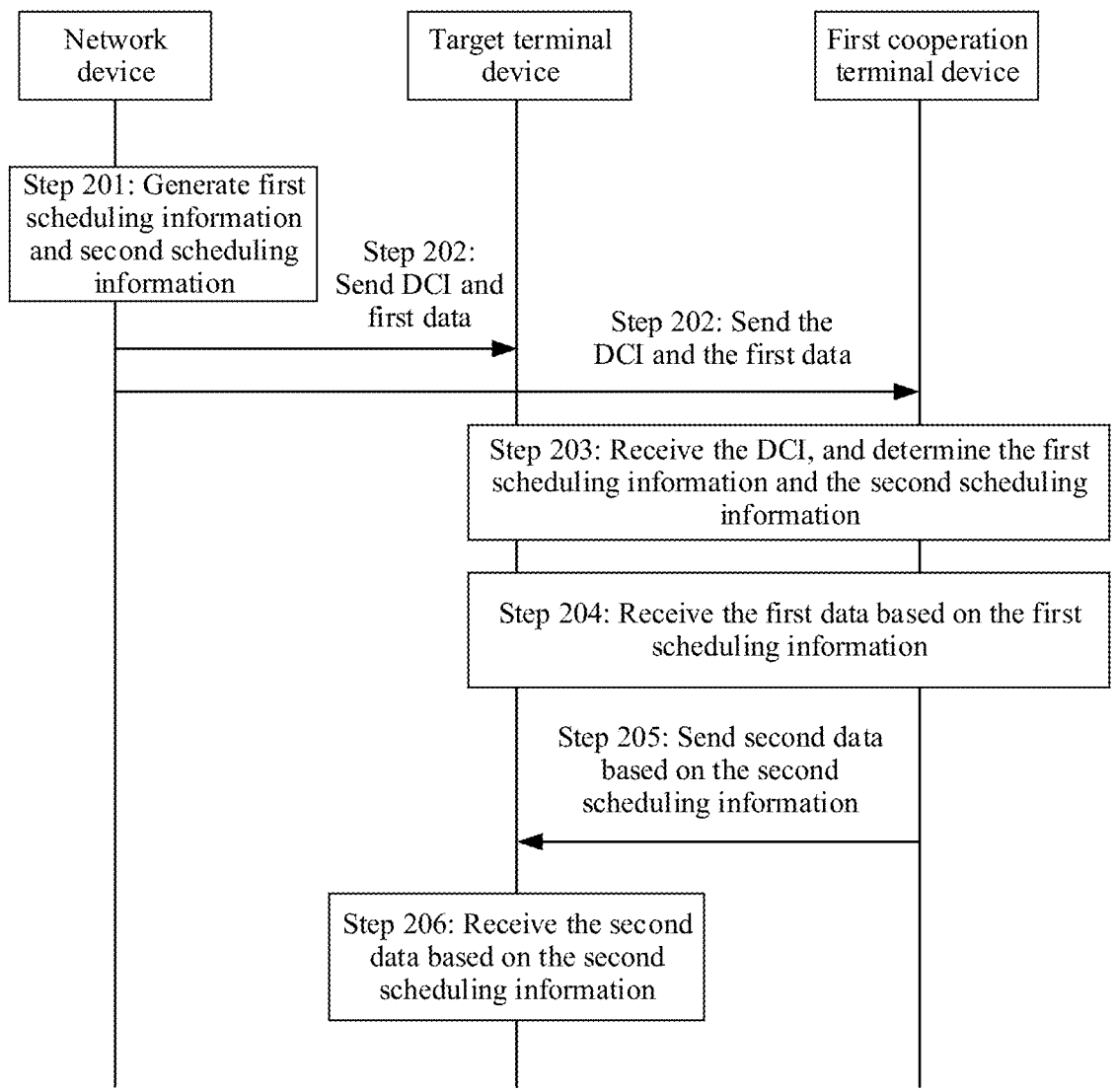
FIG. 2a is a schematic flowchart of a communication method according to an embodiment of this application.

Based on the foregoing description, for the first scenario, as shown in FIG. 2a, an embodiment of this application provides a procedure of a communication method. In the procedure, a network device may be the network device 110 in FIG. 1a, and terminal devices may be the terminal devices 120 to 140 in FIG. 1a. It may be understood that a function of the network device may alternatively be implemented by using a chip used in the network device, or another apparatus is used to support the network device in implementing the function of the network device. A function of the terminal device may alternatively be implemented by using a chip used in the terminal device, or another apparatus is used to support the terminal device in implementing the function of the terminal device. The procedure includes the following steps.

Step 201: A network device generates first scheduling information and second scheduling information.

The first scheduling information indicates a downlink transmission parameter and a downlink time-frequency resource that are used by a target terminal device and at least one cooperation terminal device to receive first data from the network device. Specifically, the target terminal device and the at least one cooperation terminal device belong to one cooperation transmission group. For example, the TUE, the CUE 1, and the CUE 2 shown in FIG. 1a belong to one cooperation transmission group. The first data from the network device may be the data sent by the network device to the target terminal device and the at least one cooperation terminal device in the first phase of the cooperation transmission mode. The first scheduling information is used to indicate the target terminal device and the at least one cooperation terminal device to receive the first data on the corresponding downlink time-frequency resource by using the downlink transmission parameter.

The second scheduling information indicates a sidelink transmission parameter and a sidelink time-frequency resource that are used by the at least one cooperation terminal device to send second data to the target terminal device. Specifically, the second data sent by the at least one cooperation terminal device to the target terminal device may be generated by the at least one cooperation terminal device based on first data received by each cooperation terminal device. For a specific generation process, refer to the foregoing embodiment of cooperation transmission. Details are not described herein again. The second scheduling information is used to indicate the at least one cooperation terminal device to send the second data on the corresponding sidelink time-frequency resource by using the sidelink transmission parameter, and indicate the target terminal device to receive the second data on the corresponding sidelink time-frequency resource by using the sidelink transmission parameter.

In a possible implementation, the first scheduling information and the second scheduling information each include one or more of the following transmission parameters: a modulation and coding scheme, a time-frequency resource, a multiple-input multiple-output mode, a hybrid automatic repeat request parameter, priority information, and the like.

Step 202: The network device sends downlink control information to the target terminal device and the at least one cooperation terminal device.

Figure 3:
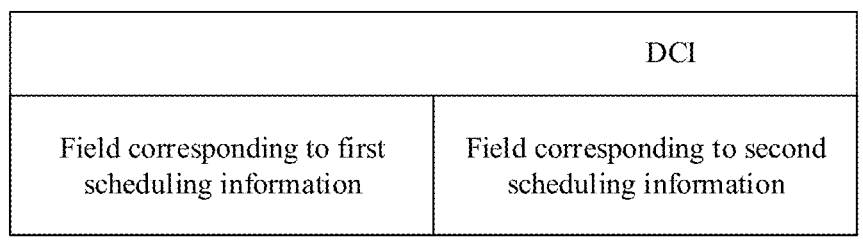
FIG. 3 is a schematic flowchart of a communication method according to an embodiment of this application.

The downlink control information includes the first scheduling information and the second scheduling information. For example, as shown in FIG. 3, the DCI includes a field that carries the first scheduling information and a field that carries the second scheduling information.

Further, the network device sends the first data based on the DCI.

Specifically, the network device sends the first data to the target terminal device and the at least one cooperation terminal device based on the first scheduling information in the DCI.

In the foregoing implementation, the first scheduling information for downlink transmission and the second scheduling information for sidelink transmission are included in same downlink control information, so that the network device does not need to send a plurality of pieces of downlink control information, resource overheads can be reduced, and transmission resources occupied by the control information are reduced. In this way, spectral efficiency can be improved.

Step 203: A first cooperation terminal device and the target terminal device receive the downlink control information from the network device.

The first cooperation terminal device is one of the at least one cooperation terminal device. It should be noted that the first cooperation terminal device may be a cooperation terminal device within coverage of the network device, may be a cooperation terminal device determined by the network device based on a requirement, or may be any cooperation terminal device in a cooperation transmission group. This is not limited herein.

Specifically, the first cooperation terminal device and the target terminal device blindly detect the downlink control information in candidate search space to obtain the first scheduling information and the second scheduling information.

Step 204: The first cooperation terminal device and the target terminal device receive first data from the network device based on the first scheduling information.

In another possible scenario, after receiving the downlink control information, the target terminal device may alternatively choose, based on a requirement of an actual scenario, not to receive the first data from the network device, to reduce power consumption.

Further, after obtaining the downlink control information, the first cooperation terminal may further send sidelink control information to the target terminal device, where the sidelink control information indicates a sidelink transmission parameter and a sidelink time-frequency resource that are used by the first cooperation terminal device to send second data to the target terminal device, so that the target terminal device can obtain the sidelink control information, and then receive, based on the sidelink control information by using the sidelink transmission parameter on the sidelink time-frequency resource occupied by the second data, the second data sent by the first cooperation terminal device.

Further, the target terminal device may further send a feedback message to the network device based on a decoding result of the received first data and the hybrid automatic repeat request parameter in the first scheduling information. For example, if the target terminal device correctly receives the first data, the target terminal device sends a feedback acknowledgement message to the network device. If the target terminal device does not correctly receive the first data, the target terminal device sends a feedback negative acknowledgement message to the network device.

Figure 2B:
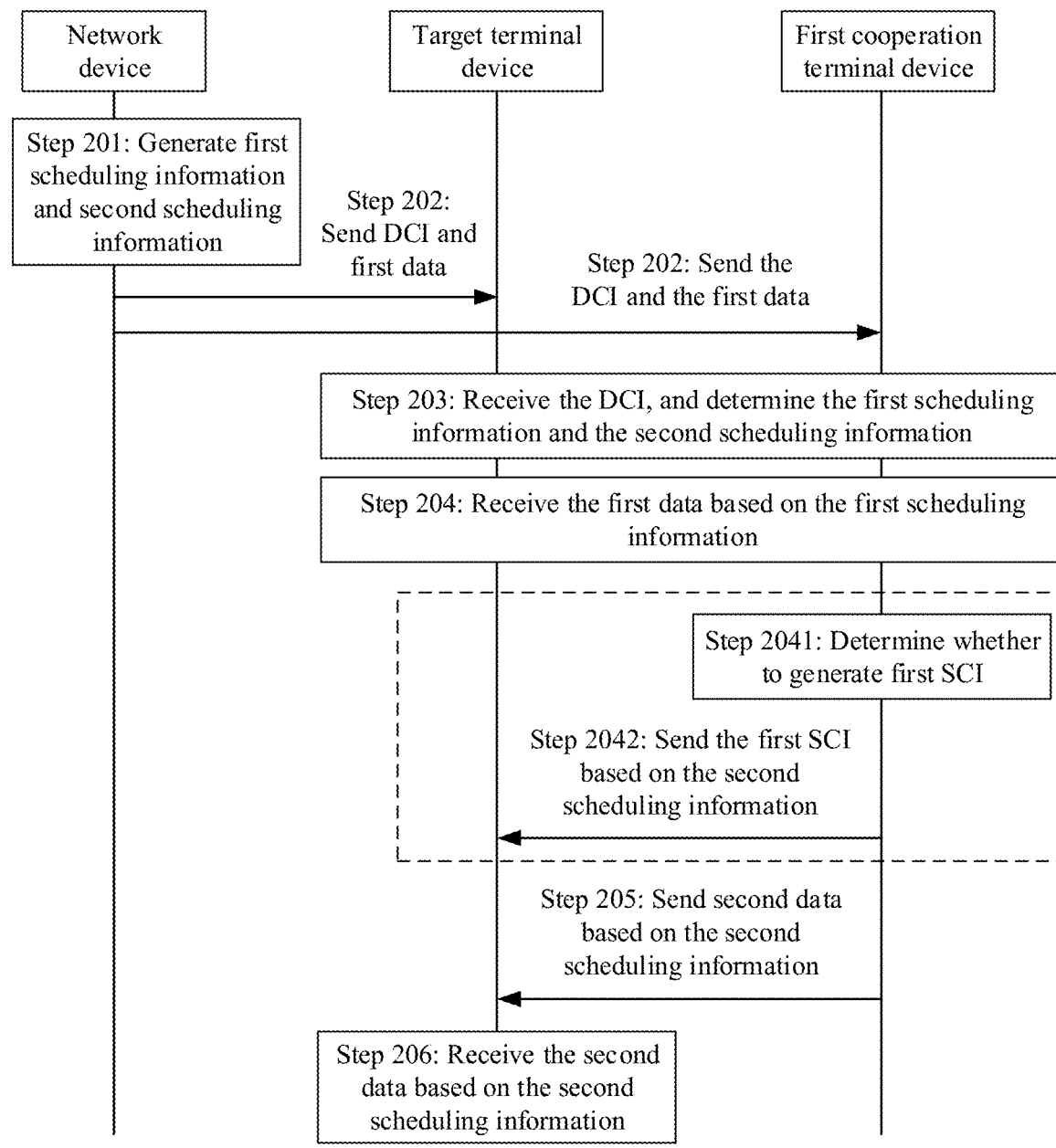
FIG. 2b is a schematic flowchart of a communication method according to an embodiment of this application.

Based on the foregoing feedback acknowledgement message or feedback negative acknowledgement message, as shown in FIG. 2b, to avoid repeatedly sending control information and wasting resources, before the first cooperation terminal device sends the sidelink control information to the target terminal device, the procedure may further include the following steps.

Step 2041: The first cooperation terminal monitors the feedback acknowledgement message or the feedback negative acknowledgement message sent by the target terminal device, to determine whether the sidelink control information needs to be generated.

The feedback acknowledgement message or the feedback negative acknowledgement message is used by the target terminal device to feed back, to the network device, whether the first data is correctly parsed. The first cooperation terminal may determine, by monitoring whether the feedback acknowledgement message or the feedback negative acknowledgement message exists, whether the target terminal device correctly receives the downlink control information.

Step 2042: If the first cooperation terminal device does not obtain, through monitoring within preset duration, the feedback acknowledgement message or the feedback negative acknowledgement message sent by the target terminal device, it is determined that the target terminal device does not correctly receive the downlink control information, and the first cooperation terminal may send the sidelink control information to the target terminal device, so that the target terminal device may receive, based on the sidelink control information, the second data sent by the first cooperation terminal device.

In addition, if the first cooperation terminal device determines that the target terminal device receives the downlink control information, the first cooperation terminal device may cancel sending the sidelink control information to the target terminal device, to reduce overheads of control information resources.

Step 205: The first cooperation terminal device sends the second data to the target terminal device based on the second scheduling information.

It should be noted that, if the first cooperation terminal device performs step 2042, step 205 may also be performed simultaneously. This is not limited herein.

Step 206: The target terminal device receives the second data from the first cooperation terminal device based on the second scheduling information.

In the foregoing implementation, the first scheduling information for downlink transmission and the second scheduling information for sidelink transmission are included in same DCI, so that the cooperation terminal device and the target terminal device can need to receive a PDCCH only once based on one piece of DCI configured by the network device. This reduces processing complexity of the terminal devices.

Figure 2C:
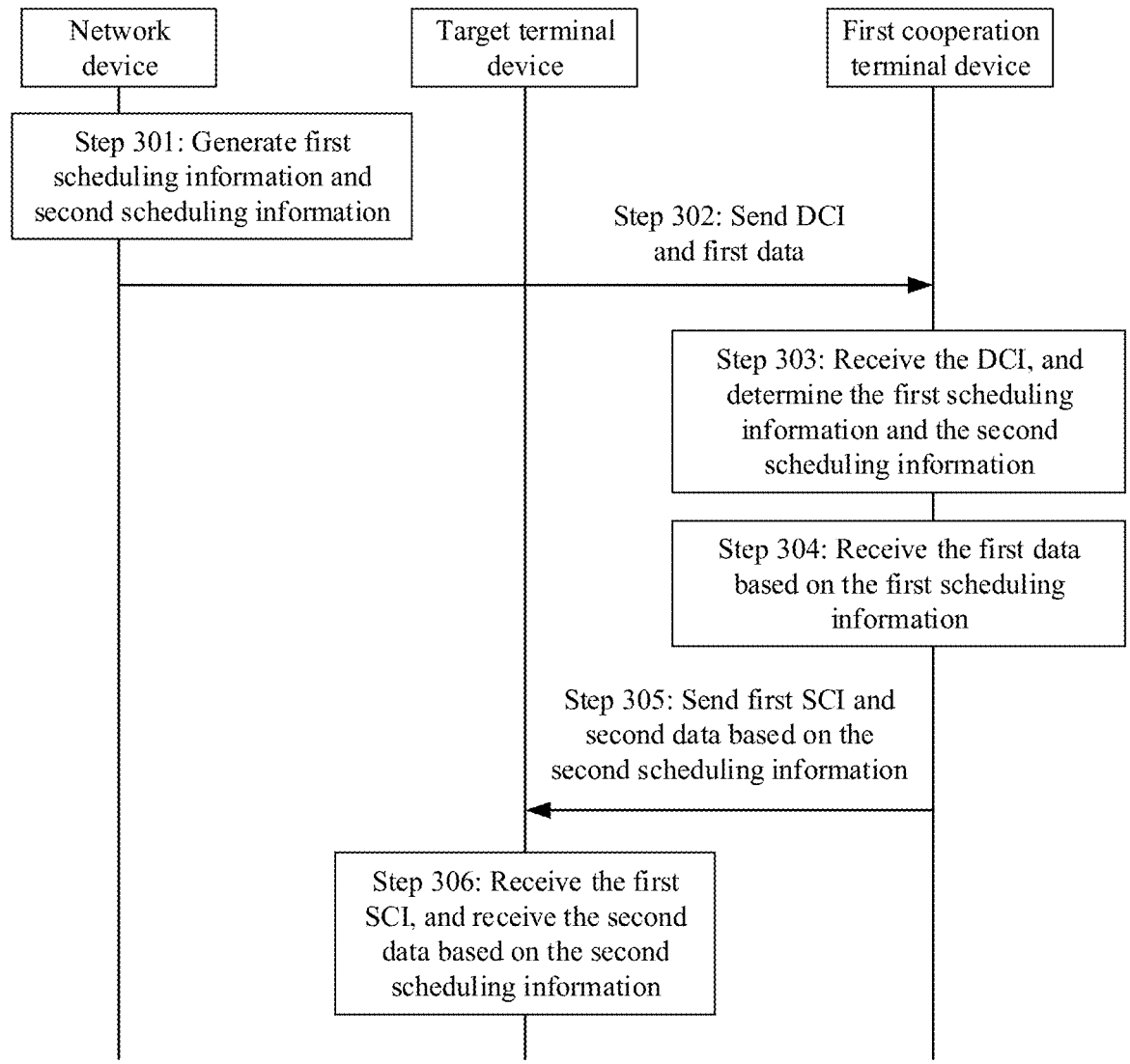
FIG. 2c is a schematic flowchart of a communication method according to an embodiment of this application.

For the second scenario, as shown in FIG. 2c, an embodiment of this application provides a procedure of a communication method. In the procedure, a network device may be the network device 110 in FIG. 1B, and terminal devices may be the terminal devices 120 to 140 in FIG. 1B. It may be understood that a function of the network device may alternatively be implemented by using a chip used in the network device, or another apparatus is used to support the network device in implementing the function of the network device. A function of the terminal device may alternatively be implemented by using a chip used in the terminal device, or another apparatus is used to support the terminal device in implementing the function of the terminal device. The procedure includes the following steps.

Step 301: A network device generates first scheduling information and second scheduling information.

The first scheduling information indicates a downlink transmission parameter and a downlink time-frequency resource that are used by at least one cooperation terminal device to receive first data from the network device. The first data from the network device may be the data sent by the network device to the at least one cooperation terminal device in the first phase of the cooperation transmission mode. The first scheduling information is used to indicate the at least one cooperation terminal device to receive the first data on the corresponding downlink time-frequency resource by using the downlink transmission parameter.

The second scheduling information indicates a sidelink transmission parameter and a sidelink time-frequency resource that are used by at least one cooperation terminal device to send second data to a target terminal device. Specifically, the target terminal device and the at least one cooperation terminal device belong to one cooperation transmission group. For example, the TUE, the CUE 1, and the CUE 2 shown in FIG. 1B belong to one cooperation transmission group. The second data sent by the at least one cooperation terminal device to the target terminal device may be generated by the at least one cooperation terminal device based on first data received by each cooperation terminal device. For a specific generation process, refer to the foregoing embodiment of cooperation transmission. Details are not described herein again. The second scheduling information is used to indicate the at least one cooperation terminal device to send the second data on the corresponding sidelink time-frequency resource by using the sidelink transmission parameter.

In a possible implementation, the first scheduling information and the second scheduling information each include one or more of the following transmission parameters: a modulation and coding scheme, a time-frequency resource, a multiple-input multiple-output mode, a hybrid automatic repeat request parameter, priority information, and the like.

Step 302: The network device sends downlink control information to the at least one cooperation terminal device.

The downlink control information includes the first scheduling information and the second scheduling information. For example, as shown in FIG. 3, the DCI includes a field that carries the first scheduling information and a field that carries the second scheduling information.

Further, the network device may send the DCI, and send the first data based on the DCI.

Specifically, the network device may send the first data to the at least one cooperation terminal device based on the first scheduling information in the DCI.

In the foregoing implementation, the first scheduling information for downlink transmission and the second scheduling information for sidelink transmission are included in same downlink control information, so that the network device does not need to send a plurality of pieces of downlink control information, resource overheads can be reduced, and transmission resources occupied by the control information are reduced. In this way, spectral efficiency can be improved.

Step 303: A first cooperation terminal device receives the downlink control information from the network device.

The first cooperation terminal device is one of the at least one cooperation terminal device. It should be noted that the first cooperation terminal device may be a cooperation terminal device within coverage of the network device, may be a cooperation terminal device determined by the network device based on a requirement, or may be any cooperation terminal device in a cooperation transmission group. This is not limited herein.

Step 304: The first cooperation terminal device receives the first data from the network device based on the first scheduling information.

Step 305: After obtaining the downlink control information, the first cooperation terminal device sends sidelink control information to the target terminal device, and sends second data to the target terminal device based on the second scheduling information.

The sidelink control information indicates a sidelink transmission parameter and a sidelink time-frequency resource that are used by the first cooperation terminal device to send the second data to the target terminal device, so that the target terminal device can obtain the sidelink control information, and then receive, based on the sidelink control information by using the sidelink transmission parameter on the sidelink time-frequency resource occupied by the second data, the second data sent by the first cooperation terminal device.

Step 306: The target terminal device receives the sidelink control information from the first cooperation terminal device, and receives the second data from the first cooperation terminal device based on the second scheduling information.

Specifically, the target terminal device blindly detects the sidelink control information in candidate search space to obtain the second scheduling information. Then, the target terminal device may receive the second data from the first cooperation terminal device based on the second scheduling information.

In the foregoing implementation, the first scheduling information for downlink transmission and the second scheduling information for sidelink transmission are included in same DCI, so that the cooperation terminal device may generate, based on one piece of DCI configured by the network device, SCI to be sent to the target terminal device, the network device needs to send a PDCCH only once, and correspondingly, the cooperation terminal device needs to receive the PDCCH only once. In this way, processing complexity of the cooperation terminal device and resource consumption are reduced.

The following specifically describes content of the downlink control information in the embodiments of this application.

Example 1

For a scenario in which there is only one CUE, as shown in FIG. 4a, the downlink control information includes a field corresponding to a downlink transmission parameter, a field corresponding to a downlink time-frequency resource, a field corresponding to a sidelink transmission parameter, and a field corresponding to a sidelink time-frequency resource.

In a specific implementation process, a network device may send first data on the downlink time-frequency resource by using the downlink transmission parameter. The cooperation terminal device may receive the first data on the downlink time-frequency resource by using the downlink transmission parameter based on the received downlink control information, and then send second data on the sidelink time-frequency resource by using the sidelink transmission parameter.

For example, the CUE is a CUE 1. The field corresponding to the downlink transmission parameter may include a downlink transmission parameter 101, for example, an MCS parameter, a HARQ feedback parameter, a MIMO mode parameter, or a priority, that is configured by the network device for the CUE 1 and that is required for downlink transmission and a downlink transmission parameter 102, for example, an MCS parameter, a HARQ feedback parameter, a MIMO mode parameter, or a priority, that is configured by the network device for a TUE and that is required for downlink transmission. Certainly, the downlink transmission parameter 101 and the downlink transmission parameter 102 may be the same or different. If the downlink transmission parameter 101 and the downlink transmission parameter 102 are the same, the field corresponding to the downlink transmission parameter may carry only the downlink transmission parameter 101 or the downlink transmission parameter 102. The field corresponding to the downlink time-frequency resource includes a downlink time-frequency resource 101 configured by the network device for the CUE 1 and a downlink time-frequency resource 102 configured by the network device for the TUE. The downlink time-frequency resource 101 and the downlink time-frequency resource 102 may be the same or different. If the downlink time-frequency resource 101 and the downlink time-frequency resource 102 are the same, the field corresponding to the downlink time-frequency resource may carry only the downlink time-frequency resource 101 or the downlink time-frequency resource 102.

The network device may send the first data to the CUE 1 on the downlink time-frequency resource 101 by using the downlink transmission parameter 101, and send the first data to the TUE on the downlink time-frequency resource 102 by using the downlink transmission parameter 102. If the CUE 1 correctly receives the downlink control information, the CUE 1 may receive the first data on the downlink time-frequency resource 101 by using the downlink transmission parameter 101.

The field corresponding to the sidelink transmission parameter includes a sidelink transmission parameter 101, for example, an MCS parameter, a HARQ feedback parameter, a MIMO mode parameter, or a priority, that is configured by the network device for the CUE 1 and that is required for sidelink transmission. The field corresponding to the downlink time-frequency resource may include a sidelink time-frequency resource 101 that is configured by the network device for the CUE 1 and that is required for sidelink transmission.

After receiving the first data, the CUE 1 may generate the second data in a plurality of manners. In a possible implementation, the downlink control information may alternatively include a manner, configured by the network device for the CUE 1, of generating the second data. For example, the second data is a part of the first data, or the second data is all of the first data. Alternatively, the second data may be data in a signal of the first data correctly received by the CUE 1 and sent by the network device. This is not limited herein. In another possible implementation, a manner in which the CUE 1 generates the second data may be preconfigured by the network device for the CUE 1, or may be a manner that is selected by the CUE 1 from a plurality of generation manners set in the standard based on a requirement and in which the CUE 1 generates the second data.

After generating the second data, the CUE 1 may send the second data to the TUE on the sidelink time-frequency resource 101 by using the sidelink transmission parameter 101.

Before sending the second data, the CUE 1 may further send SCI to the TUE, where the SCI carries the field corresponding to the sidelink transmission parameter and the field corresponding to the sidelink time-frequency resource.

Further, the CUE 1 may further determine, based on a HARQ feedback acknowledgement message or a HARQ feedback negative acknowledgement message sent by the TUE, whether the TUE receives the downlink control information. If the CUE 1 determines that the TUE receives the downlink control information, the CUE 1 may cancel sending the SCI, to reduce signaling consumption.

If the TUE receives the downlink control information, the TUE may receive, on the downlink time-frequency resource by using the downlink transmission parameter, the first data sent by the network device, and receive, on the sidelink time-frequency resource by using the sidelink transmission parameter, the second data sent by the CUE.

For example, if the TUE receives the downlink control information, the TUE may receive, on the downlink time-frequency resource 102 by using the downlink transmission parameter 102, the first data sent by the network device. The TUE may receive, on the sidelink time-frequency resource 101 by using the sidelink transmission parameter 101, the second data sent by the CUE 1.

If the target terminal device receives the first data sent by the network device and the second data sent by the CUE 1, the target terminal device may jointly decode the signal of the first data and a signal of the second data, to improve a decoding rate.

Because there is only one CUE, transmission parameters in second scheduling information may not carry an identifier of the CUE, but carry only an identifier of a user cooperation group. The identifier of the CUE may be a radio network temporary identifier RNTI, or may be another identifier. Certainly, neither the identifier of the CUE nor the identifier of the user cooperation group may be carried. This is not limited herein.

Example 2

For a scenario in which a network device transmits first data to N CUEs and a TUE on a same time-frequency resource by using a same transmission parameter, first scheduling information indicates a first downlink transmission parameter and a first downlink time-frequency resource, where the first downlink transmission parameter and the first downlink time-frequency resource are used by the network device to send the first data to the N CUEs and the TUE on the first downlink time-frequency resource by using the first downlink transmission parameter. Each of the N CUEs and/or the TUE receive/receives the first data on the first downlink time-frequency resource by using the first downlink transmission parameter.

In a specific implementation process, the network device may send the first data on the first downlink time-frequency resource by using the first downlink transmission parameter in a broadcast or multicast manner. The N CUEs may receive the first data on the first downlink time-frequency resource by using the first downlink transmission parameter based on received downlink control information. If the TUE receives the downlink control information, the TUE may receive, on the first downlink time-frequency resource by using the first downlink transmission parameter, the first data sent by the network device.

For example, as shown in FIG. 4b, the downlink control information includes a field corresponding to the first downlink transmission parameter, a field corresponding to the first downlink time-frequency resource, and a field corresponding to second scheduling information.

For example, the N CUEs include a CUE 1 and a CUE 2. The field of the first downlink transmission parameter may include a first downlink transmission parameter 201 that is configured by the network device for the CUE 1, the CUE 2, and the TUE and that is required for downlink transmission. The field of the first downlink time-frequency resource may include a first downlink time-frequency resource 201 that is configured by the network device for the CUE 1, the CUE 2, and the TUE and that is required for downlink transmission.

In this case, the network device may send the first data on the first downlink time-frequency resource 201 by using the first downlink transmission parameter 201 in a broadcast or multicast manner. The CUE 1 and the CUE 2 may decode, based on the received downlink control information, the field corresponding to the first downlink transmission parameter 201 and the field corresponding to the first downlink time-frequency resource 201, and then receive the first data on the first downlink time-frequency resource 201 by using the first downlink transmission parameter 201. If the TUE receives the downlink control information, the TUE may decode the field of the first downlink transmission parameter 201 and the field of the first downlink time-frequency resource 201, and then receive, on the first downlink time-frequency resource 201 by using the first downlink transmission parameter 201, the first data sent by the network device.

Further, after receiving the first data, the CUE 1 may generate, in a plurality of manners, second data 1 to be sent to the TUE. After receiving the first data, the CUE 2 may generate, in a plurality of manners, second data 2 to be sent to the TUE. The second data 1 and the second data 2 may be different or the same. A specific generation manner may be preconfigured by the network device, or may be persistently, semi-persistently, or dynamically scheduled by the network device. For a specific sending manner, refer to the foregoing embodiment. Details are not described herein again.

The CUE 1 obtains a resource of a sidelink transmission link between the CUE 1 and the TUE by parsing the field corresponding to the second scheduling information in the downlink control information. For example, the resource of the sidelink transmission link between the CUE 1 and the TUE is a sidelink time-frequency resource 201 and a sidelink transmission parameter 201. Then, the CUE 1 sends the second data 1 to the TUE on the sidelink time-frequency resource 201 by using the sidelink transmission parameter 201. Likewise, the CUE 2 obtains a resource of a sidelink transmission link between the CUE 2 and the TUE by parsing the field corresponding to the second scheduling information in the downlink control information. For example, the resource of the sidelink transmission link between the CUE 2 and the TUE is a sidelink time-frequency resource 202 and a sidelink transmission parameter 202. Then, the CUE 2 sends the second data 2 to the TUE on the sidelink time-frequency resource 202 by using the sidelink transmission parameter 202.

If the TUE receives the downlink control information, the TUE obtains the resource of the sidelink transmission link between the CUE 1 and the TUE by parsing the field corresponding to the second scheduling information, and then the TUE receives, on the sidelink time-frequency resource 201 by using the sidelink transmission parameter 201, the second data 1 sent by the CUE 1. The TUE may obtain the resource of the sidelink transmission link between the CUE 2 and the TUE by parsing the field corresponding to the second scheduling information, and then the TUE receives, on the sidelink time-frequency resource 202 by using the sidelink transmission parameter 202, the second data 2 sent by the CUE 2.

In this way, the TUE jointly decodes a signal of the received first data and/or signals of the received second data 1 and the received second data 2.

For example, if the TUE receives a signal 1 of the first data sent by the network device, a signal 2 of the second data 1 sent by the CUE 1, and a signal 3 of the second data 2 sent by the CUE 2, the TUE may jointly decode the signal 1, the signal 2, and the signal 3, to improve accuracy of decoding the first data, and improve transmission performance of the first data.

For another example, if the TUE receives the signal 2 of the second data 1 sent by the CUE 1 and the signal 3 of the second data 2 sent by the CUE 2, the TUE may jointly decode the signal 2 and the signal 3, to improve accuracy of decoding the second data, and improve cooperation transmission performance.

In the foregoing implementation, because a base station transmits the first data to the N CUEs and the TUE on the same time-frequency resource by using the same transmission parameter, there is no need to generate and indicate N+1 pieces of downlink control information for the N CUEs and the TUE. Only the field corresponding to the first downlink transmission parameter and the field corresponding to the first downlink time-frequency resource need to be transmitted, so that time-frequency resources occupied by a control message in user cooperation transmission can be reduced, and overheads of resources occupied by the downlink control information can be reduced. In this way, spectral efficiency can be improved.

Example 3

For a scenario in which a network device assigns, to N CUEs, a same sidelink transmission parameter and a same sidelink time-frequency resource that are used to transmit second data, second scheduling information indicates a first sidelink transmission parameter and a first sidelink time-frequency resource. The first sidelink transmission parameter and the first sidelink time-frequency resource are used by each of the at least one cooperation terminal device to send the second data. The first sidelink transmission parameter may be a sidelink transmission parameter required by one CUE to transmit the second data, and the first sidelink time-frequency resource may be a sidelink time-frequency resource required by one CUE to transmit the second data. For example, as shown in FIG. 4c, downlink control information includes a field corresponding to first scheduling information, a field corresponding to the first sidelink transmission parameter, and a field corresponding to the first sidelink time-frequency resource. The cooperation terminal device may send the second data on the first sidelink time-frequency resource by using the first sidelink transmission parameter based on the received downlink control information. If a target terminal device receives the downlink control information, the target terminal device may receive, on the first sidelink time-frequency resource by using the first sidelink transmission parameter, the second data sent by the N CUEs.

For example, N is 2. To be specific, the N CUEs may include a CUE 1 and a CUE 2. In a possible implementation, fields corresponding to the first scheduling information may include a field 301, a field 302, and a field 303. The field 301 may include a downlink transmission parameter 301 and a downlink time-frequency resource 301 that are configured by the network device for the CUE 1 and that are required for downlink transmission. The field 302 may include a downlink transmission parameter 302 and a downlink time-frequency resource 302 that are configured by the network device for the CUE 2 and that are required for downlink transmission. The field 303 may include a downlink transmission parameter 303 and a downlink time-frequency resource 303 that are configured by the network device for the TUE and that are required for downlink transmission.

The network device may send first data to the CUE 1 on the downlink time-frequency resource 301 by using the downlink transmission parameter 301, send the first data to the CUE 2 on the downlink time-frequency resource 302 by using the downlink transmission parameter 302, and send the first data to the TUE on the downlink time-frequency resource 303 by using the downlink transmission parameter 303.

If the CUE 1 correctly receives the downlink control information, the CUE 1 may receive the first data on the downlink time-frequency resource 301 based on the downlink transmission parameter 301 by decoding the field 301. If the CUE 2 correctly receives the downlink control information, the CUE 2 may receive the first data on the downlink time-frequency resource 302 based on the downlink transmission parameter 302 by decoding the field 302. If the TUE correctly receives the downlink control information, the TUE may receive the first data on the downlink time-frequency resource 303 by using the downlink transmission parameter 303 by decoding the field 303.

Certainly, the downlink transmission parameter 301, the downlink transmission parameter 302, and the downlink transmission parameter 303 may be the same or different. Downlink transmission parameters carried in the fields corresponding to the first scheduling information may be determined depending on whether the downlink transmission parameter 301, the downlink transmission parameter 302, and the downlink transmission parameter 303 are the same. For example, if it is determined that the downlink transmission parameter 301 and the downlink transmission parameter 302 are the same, only the downlink transmission parameter 301 in the field 301 and the downlink transmission parameter 303 in the field 303 may be carried in the fields corresponding to the first scheduling information, to indicate the CUE 1 and the CUE 2 to use the downlink transmission parameter 301 as a downlink transmission parameter of the CUE 1 and the CUE 2, and indicate the TUE to use the downlink transmission parameter 303 as a downlink transmission parameter of the TUE. Likewise, the downlink time-frequency resource 301, the downlink time-frequency resource 302, and the downlink time-frequency resource 303 may be the same or different. Downlink time-frequency resources carried in the fields corresponding to the first scheduling information may be determined depending on whether the downlink time-frequency resource 301, the downlink time-frequency resource 302, and the downlink time-frequency resource 303 are the same. For example, if it is determined that the downlink time-frequency resource 301 and the downlink time-frequency resource 303 are the same, only the downlink time-frequency resource 301 in the field 301 and the downlink time-frequency resource 302 in the field 302 may be carried in the fields corresponding to the first scheduling information, to indicate the CUE 1 and the TUE to use the downlink time-frequency resource 301 as a downlink time-frequency resource of the CUE 1 and the TUE, and indicate the CUE 2 to use the downlink time-frequency resource 302 as a downlink time-frequency resource of the CUE 2.

In this case, the fields corresponding to the first scheduling information include a field 301', a field 302', and a field 303'. The field 301' may include the downlink transmission parameter 301 and the downlink time-frequency resource 301. The field 302' may include the downlink time-frequency resource 302. The field 303' may include the downlink transmission parameter 303.

The network device may send the first data to the CUE 1 on the downlink time-frequency resource 301 by using the downlink transmission parameter 301, send the first data to the CUE 2 on the downlink time-frequency resource 302 by using the downlink transmission parameter 301, and send the first data to the TUE on the downlink time-frequency resource 301 by using the downlink transmission parameter 303.

If the CUE 1 correctly receives the downlink control information, the CUE 1 may receive the first data on the downlink time-frequency resource 301 based on the downlink transmission parameter 301 by decoding the field 301'. If the CUE 2 correctly receives the downlink control information, the CUE 2 may receive the first data on the downlink time-frequency resource 302 based on the downlink transmission parameter 301 by decoding the field 301' and the field 302'. If the TUE correctly receives the downlink control information, the TUE may receive the first data on the downlink time-frequency resource 301 by using the downlink transmission parameter 303 by decoding the field 301' and the field 303'.

The field of the first sidelink transmission parameter may include a sidelink transmission parameter 301, for example, an MCS parameter, a HARQ feedback parameter, a MIMO mode parameter, or a priority, that is assigned by the network device to the CUE 1 and the CUE 2 and that is required for transmitting the second on a sidelink transmission link. The field of the first sidelink time-frequency resource may include a sidelink time-frequency resource 301 that is assigned by the network device to the CUE 1 and the CUE 2 and that is required for transmitting the second data on the sidelink transmission link.

After receiving the first data, the CUE 1 and/or the CUE 2 may generate the second data in a plurality of manners.

It should be noted that, because a completely same resource is assigned to the sidelink transmission link, second data generated by the N CUEs needs to be the same, to avoid interference between signals of the second data sent by the N CUEs on the sidelink transmission link.

In a possible implementation, the downlink control information may alternatively include a same manner, configured by the network device for the N CUEs, of generating second data. For example, the second data is a part of the first data, or the second data is all of the first data. Alternatively, the second data may be data in a signal of the first data correctly decoded by the CUE 1 and sent by the network device. This is not limited herein. In a possible implementation, a manner in which the N CUEs generate the second data may be preconfigured by the network device for the N CUEs.

After generating the second data, the CUE 1 may send the second data to the TUE on the first sidelink time-frequency resource 301 based on the first sidelink transmission parameter 301 by decoding the field of the first sidelink time-frequency resource and the field of the first sidelink transmission parameter. After generating the second data, the CUE 2 may send the second data to the TUE on the first sidelink time-frequency resource 301 by using the first sidelink transmission parameter 301 by decoding the field of the first sidelink time-frequency resource 301 and the field of the first sidelink transmission parameter 301.

If the target terminal device receives the downlink control information, the target terminal device may receive, on the first sidelink time-frequency resource 301 by using the first sidelink transmission parameter 301 by decoding the field of the first sidelink time-frequency resource 301 and the field of the first sidelink transmission parameter 301, a signal 1 of the second data sent by the CUE 1 and/or a signal 2 of the second data sent by the CUE 2.

If the target terminal device receives the signal 1 of the second data sent by the CUE 1 and the signal 2 of the second data sent by the CUE 2, the target terminal device may jointly decode the signal 1 and the signal 2, to improve accuracy of decoding the second data, and improve cooperation transmission performance.

Because a completely same first sidelink transmission parameter and a completely same first sidelink time-frequency resource are used by a plurality of CUEs for sidelink transmission in the second phase, the sidelink transmission parameter and the sidelink time-frequency resource in the second scheduling information do not need to be distinguished among the plurality of CUEs. Resource scheduling for a sidelink can be implemented by carrying only the field corresponding to the first sidelink time-frequency resource and the field corresponding to the first sidelink transmission parameter, so that time-frequency resources occupied by downlink control information in user cooperation transmission can be reduced, and overheads of resources occupied by the downlink control information are reduced. In this way, spectral efficiency can be improved.

Example 4

For a scenario in which the network device assigns, to N CUEs, different sidelink transmission parameters and different sidelink time-frequency resources that are used to transmit second data, second scheduling information may include N pieces of scheduling sub-information. Each of the N pieces of scheduling sub-information correspondingly indicates a sidelink transmission parameter and a sidelink time-frequency resource of each cooperation terminal device.

As shown in FIG. 4d, downlink control information includes a field corresponding to first scheduling information, a field of the $1^{st}$ scheduling sub-information, a field of the $2^{nd}$ scheduling sub-information, . . . , and a field of an $N^{th}$ scheduling sub-information. Each of the N cooperation terminal devices may send the second data based on the received downlink control information and the sidelink time-frequency resource indicated by the scheduling sub-information of the cooperation terminal device and by using a sidelink transmission parameter indicated by the scheduling sub-information of the cooperation terminal device. If a target terminal device receives the downlink control information, the target terminal device may receive, on the N time-frequency resources indicated by the N pieces of scheduling sub-information and by using the N sidelink transmission parameters, the second data sent by the N CUEs. If the target terminal device correctly receives the downlink control information, the target terminal device may determine, based on the downlink control information, first scheduling sub-information corresponding to a first cooperation terminal device, and then receive the second data on a sidelink time-frequency resource indicated by the first scheduling sub-information and by using a sidelink transmission parameter indicated by the first scheduling sub-information.

For example, N is 2. That is, N CUEs include a CUE 1 and a CUE 2. For a field format of the first scheduling information indicated in the downlink control information, refer to Embodiment 2 and Embodiment 3. Details are not described herein again. A field of the second scheduling information may include a first scheduling sub-information field and a second scheduling sub-information field. The first scheduling sub-information field may include a sidelink transmission parameter 401, for example, an MCS parameter, a HARQ feedback parameter, a MIMO mode parameter, or a priority, and a sidelink time-frequency resource 401 that are assigned to the CUE 1 and that are required for transmitting the second data on a sidelink transmission link. The second scheduling sub-information field may include a sidelink transmission parameter 402, for example, an MCS parameter, a HARQ feedback parameter, a MIMO mode parameter, or a priority, and a sidelink time-frequency resource 402 that are assigned to the CUE 2 and that are required for transmitting the second data on the sidelink transmission link.

If the CUE 1 correctly receives the downlink control information, the CUE 1 may send second data 1 on the sidelink time-frequency resource 401 based on the sidelink transmission parameter 401 by decoding the first scheduling sub-information field. If the CUE 2 correctly receives the downlink control information, the CUE 2 may send second data 2 on the sidelink time-frequency resource 402 based on the sidelink transmission parameter 402 by decoding the second scheduling sub-information field. The second data 1 and the second data 2 may be the same or different. For a specific generation manner of generating the first data 1 by the CUE 1 and a specific generation manner of generating the second data 2 by the CUE 2, refer to the foregoing embodiment. Details are not described herein again.

If the TUE correctly receives the downlink control information, the TUE may receive, on the sidelink time-frequency resource 401 by using the sidelink transmission parameter 401 by decoding the first scheduling sub-information field and the second scheduling sub-information field, the second data 1 sent by the CUE 1, and receive, on the sidelink time-frequency resource 402 by using the sidelink transmission parameter 402 by decoding the first scheduling sub-information field and the second scheduling sub-information field, the second data 2 sent by the CUE 2.

The target terminal device may further receive the first scheduling sub-information based on SCI 1 that is sent by the CUE 1 and that carries the first scheduling sub-information, and receive second scheduling sub-information by using SCI 2 that is sent by the CUE 2 and that carries the second scheduling sub-information.

Figures 5A, 5B, 5C, 6:
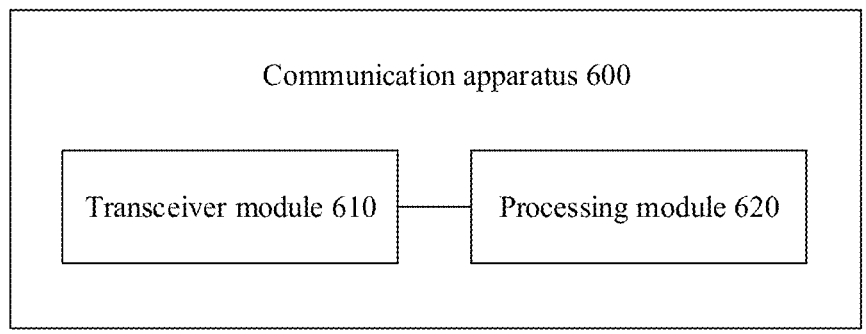
FIG. 5a to FIG. 5c each are an example diagram of a configuration of downlink control information according to an embodiment of this application.
FIG. 6 is a schematic diagram of a structure of a communication apparatus according to an embodiment of this application.

The sidelink transmission parameter 401 and the sidelink transmission parameter 402 may be the same or different. Likewise, the sidelink time-frequency resource 401 and the sidelink time-frequency resource 402 may be the same or different. In this case, the network device may further compress, depending on whether there is same content in the second scheduling information, a resource occupied by the downlink control information. In a possible implementation, as shown in FIG. 5*a*, the downlink control information includes a fourth field, a first subfield, and a second subfield, where the fourth field indicates the first scheduling information; the first subfield indicates second common scheduling information, and the second common scheduling information is a same part in the N pieces of scheduling sub-information; and the second subfield indicates a part other than the second common scheduling information in the N pieces of scheduling sub-information.

For example, if the network device determines that sidelink time-frequency resources of all of the N pieces of scheduling sub-information in the second scheduling information are the same, the first subfield corresponding to the second common scheduling information may carry indication information of the sidelink time-frequency resource. The second subfield carries N sidelink transmission parameters of the N pieces of scheduling sub-information used to transmit the second data.

In a specific implementation process, the network device sends, to the target terminal device and the first cooperation terminal device, the DCI that carries the fourth field, the first subfield, and the second subfield. The first cooperation terminal device and/or the target terminal device determine/determines the first scheduling information based on the fourth field. The first cooperation terminal device and/or the target terminal device determine/determines second scheduling information of the first cooperation terminal device based on the sidelink transmission parameter and the sidelink time-frequency resource that correspond to the first cooperation terminal device and that are in the first subfield and the second subfield.

For example, the N CUEs are the CUE 1 and the CUE 2. For a format of the first scheduling information indicated by the fourth field in the downlink control information, refer to Embodiment 2 and Embodiment 3. Details are not described herein again.

With reference to the foregoing example, a sidelink transmission parameter that needs to be carried in the second scheduling information may be determined depending on whether the sidelink transmission parameter 401 and the sidelink transmission parameter 402 are the same. For example, if it is determined that the sidelink transmission parameter 401 and the sidelink transmission parameter 402 are the same, the first subfield may include the sidelink transmission parameter 401. The second subfield may include the sidelink time-frequency resource 401 and the sidelink time-frequency resource 402.

If the CUE 1 correctly receives the downlink control information, the CUE 1 may send the second data 1 to the TUE on the sidelink time-frequency resource 401 by using the sidelink transmission parameter 401 by decoding the first subfield and the second subfield. If the CUE 2 correctly receives the downlink control information, the CUE 2 may send the second data 2 to the TUE on the sidelink time-frequency resource 402 by using the sidelink transmission parameter 401 by decoding the first subfield and the second subfield. If the TUE correctly receives the downlink control information, the TUE may receive the second data 1 on the sidelink time-frequency resource 401 by using the sidelink transmission parameter 401 by decoding the first subfield and the second subfield, and receive the second data 2 on the sidelink time-frequency resource 402 by using the sidelink transmission parameter 401 by decoding the first subfield and the second subfield.

In another possible implementation, a sidelink time-frequency resource carried in the second scheduling information may be determined depending on whether the sidelink time-frequency resource 401 and the sidelink time-frequency resource 402 are the same. For example, if the network device determines that the sidelink time-frequency resource 401 and the sidelink time-frequency resource 402 are the same, the first subfield may include the sidelink time-frequency resource 401. The second subfield may include the sidelink transmission parameter 401 and the sidelink transmission parameter 402.

If the CUE 1 correctly receives the downlink control information, the CUE 1 may send the second data 1 to the TUE on the sidelink time-frequency resource 401 by using the sidelink transmission parameter 401 by decoding the first subfield and the second subfield. If the CUE 2 correctly receives the downlink control information, the CUE 2 may send the second data 2 to the TUE on the sidelink time-frequency resource 401 by using the sidelink transmission parameter 402 by decoding the first subfield and the second subfield.

In still another possible implementation, if the network device determines that time domain resources in two pieces of scheduling sub-information in the second scheduling information are the same, the first subfield may carry a sidelink time domain resource 401' assigned by the network device to the CUE 1 and the CUE 2.

The second subfield carries the sidelink transmission parameter 401 and a sidelink frequency domain resource 401' that are assigned by the network device to the CUE 1 and a sidelink transmission parameter 402 and a sidelink frequency domain resource 402' that are assigned by the network device to the CUE 2.

If the CUE 1 correctly receives the downlink control information, the CUE 1 may obtain the sidelink time domain resource 401', the sidelink frequency domain resource 401', and the sidelink transmission parameter 401 by decoding the first subfield and the second subfield. In this case, the CUE 1 may send the second data 1 to the TUE on the sidelink time domain resource 401' and the sidelink frequency domain resource 401' by using the sidelink transmission parameter 401.

If the CUE 2 correctly receives the downlink control information, the CUE 2 may obtain a sidelink time domain resource 402', the sidelink frequency domain resource 402', and the sidelink transmission parameter 402 by decoding the first subfield and the second subfield. In this case, the CUE 2 may send the second data 2 to the TUE on the sidelink time domain resource 402' and the sidelink frequency domain resource 402' by using the sidelink transmission parameter 402.

If the TUE correctly receives the downlink control information, the TUE may receive, on the sidelink time domain resource 401' and the sidelink frequency domain resource 401' by using the sidelink transmission parameter 401 by decoding the first subfield and the second subfield, the second data 1 sent by the CUE 1, and receive, on the sidelink time domain resource 402' and the sidelink frequency domain resource 402' by using the sidelink transmission parameter 402 by decoding the first subfield and the second subfield, the second data 2 sent by the CUE 2. The TUE may jointly decode a signal of the received second data 1, a signal of the received second data 2, and/or a signal of the received first data.

In the foregoing implementation, the second scheduling information is further compressed, so that overheads of the resource occupied by the downlink control information in user cooperation transmission can be reduced, to improve spectral efficiency.

Example 5

A network device may further compress, depending on whether there is same content in first scheduling information and second scheduling information, a resource occupied by downlink control information. Specifically, as shown in FIG. 5b, the downlink control information includes a first field, a second field, and a third field.

The first field indicates first common scheduling information, and the first common scheduling information is a same part in the first scheduling information and the second scheduling information.

The second field indicates a part other than the first common scheduling information in the first scheduling information.

The third field indicates a part other than the first common scheduling information in the second scheduling information.

In a specific implementation process, the network device sends, to a target terminal device and a first cooperation terminal device, the DCI that carries a first field, a second field, and a third field. The first cooperation terminal device and/or the target terminal device determine/determines the first scheduling information based on the first field and the second field. The first cooperation terminal device and/or the target terminal device determine/determines second scheduling information of the first cooperation terminal device based on a sidelink transmission parameter and a sidelink time-frequency resource that correspond to the first cooperation terminal device and that are in the first field and the third field.

For example, N CUEs are a CUE 1 and a CUE 2. Assuming that the network device determines that MCS parameters in the first scheduling information and the second scheduling information are the same, the first field in the downlink control information may be an MCS parameter. The second field may include a field 501, a field 502, and a field 503. The field 501 may include a second downlink transmission parameter 501', for example, a HARQ feedback parameter, a MIMO mode parameter, or a priority, that is other than the MCS parameter, that is configured by the network device for the CUE 1, and that is required for downlink transmission and a downlink time-frequency resource 501. The field 502 may include a second downlink transmission parameter 502', for example, a HARQ feedback parameter, a MIMO mode parameter, or a priority, that is other than the MCS parameter, that is configured by the network device for the CUE 2, and that is required for downlink transmission and a downlink time-frequency resource 502. The field 503 may include a second downlink transmission parameter 503', for example, a HARQ feedback parameter, a MIMO mode parameter, or a priority, that is other than the MCS parameter, that is configured by the network device for the TUE, and that is required for downlink transmission and a downlink time-frequency resource 503.

The third field may include a field 511 and a field 512. The field 511 may include a second sidelink transmission parameter 501', for example, a HARQ feedback parameter, a MIMO mode parameter, or a priority, that is other than the MCS parameter, that is configured by the network device for the CUE 1, and that is required for sidelink transmission and a sidelink time-frequency resource 501. The field 512 may include a second sidelink transmission parameter 502', for example, a HARQ feedback parameter, a MIMO mode parameter, or a priority, that is other than the MCS parameter, that is configured by the network device for the CUE 2, and that is required for sidelink transmission and a downlink time-frequency resource 502.

In a transmission process, the network device sends, to the TUE, the CUE 1, and the CUE 2, the DCI that carries the first field, the second field, and the third field.

The CUE 1 determines the MCS parameter in the first field and the second downlink transmission parameter 501' in the field 501 in the second field as a downlink transmission parameter 501 used by the CUE 1 for downlink transmission. Then, the CUE 1 receives, on the downlink time-frequency resource 501 by using the downlink transmission parameter 501, first data sent by the network device.

The CUE 2 determines the MCS parameter in the first field and the second downlink transmission parameter 502' in the field 502 in the second field as a downlink transmission parameter 502 used by the CUE 2 for downlink transmission. Then, the CUE 2 receives, on the downlink time-frequency resource 502 by using the downlink transmission parameter 502, the first data sent by the network device.

If the TUE receives the downlink control information, the TUE may determine the MCS parameter in the first field and the second downlink transmission parameter 503' in the field 503 in the second field as a downlink transmission parameter 503 used by the TUE for downlink transmission. Then, the TUE receives, on the downlink time-frequency resource 503 by using the downlink transmission parameter 503, the first data sent by the network device.

For sidelink transmission, the CUE 1 determines the MCS parameter in the first field and the second sidelink transmission parameter 501' in the field 511 in the third field as a sidelink transmission parameter 501 used by the CUE 1 for sidelink transmission. Then, the CUE 1 sends second data 1 to the TUE on the sidelink time-frequency resource 501 by using sidelink transmission parameter 501.

The CUE 2 determines the MCS parameter in the first field and the second sidelink transmission parameter 502' in the field 512 in the third field as a sidelink transmission parameter 502 used by the CUE 2 for sidelink transmission. Then, the CUE 2 sends second data 2 to the TUE on the sidelink time-frequency resource 502 by using the sidelink transmission parameter 502.

If the TUE receives the downlink control information, the TUE may determine the MCS parameter in the first field and the field 511 in the third field as the sidelink transmission parameter 501 and the sidelink time-frequency resource 501 of the CUE 1, and then receive, on the sidelink time-frequency resource 501 based on the sidelink transmission parameter 501, the second data 1 sent by the TUE; and determine the first field and the field 512 in the third field as the sidelink transmission parameter 502 and the sidelink time-frequency resource 502 of the CUE 2, and then receive, on the sidelink time-frequency resource 502 by using the sidelink transmission parameter 502, the second data 2 sent by the TUE.

In the foregoing implementation, overheads of the resource occupied by the downlink control information in user cooperation transmission can be reduced, to improve spectral efficiency.

Example 6

With reference to the foregoing embodiment, a network device may further compress, depending on whether there is same content in first scheduling information and second scheduling information, a resource occupied by downlink control information. Specifically, as shown in FIG. 5c, the downlink control information includes a first field, a second field, a fifth field, and a sixth field. The first field indicates first common scheduling information, and the first common scheduling information is a same part in the first scheduling information and the second scheduling information; the second field indicates a part other than the first common scheduling information in the first scheduling information; the fifth field indicates a part other than the first common scheduling information in second common scheduling information, and the second common scheduling information is a same part in N pieces of scheduling sub-information; and the sixth field indicates a part other than the first common scheduling information and the second common scheduling information in the second scheduling information.

In a specific implementation process, the network device may send, to a target terminal device and a first cooperation terminal device, the DCI that carries the first field, the second field, the fifth field, and the sixth field. The first cooperation terminal device and/or the target terminal device determine/determines the first scheduling information based on the first field and the second field. The first cooperation terminal device and/or the target terminal device determine/determines second scheduling information of the first cooperation terminal device based on a transmission parameter and a time-frequency resource that correspond to the first cooperation terminal device and that are in the first field, the fifth field, and the sixth field.

For example, if the network device determines that MCS parameters and MIMO mode parameters in the first scheduling information and the second scheduling information are the same, and determines that sidelink time-frequency resources of all of the N pieces of scheduling sub-information in the second scheduling information are the same, the first field may carry the MCS parameter and the MIMO mode parameter, and the fifth field may carry the sidelink time-frequency resource. The second field carries a downlink time-frequency resource used to transmit first data and a downlink transmission parameter other than indication information of the MCS parameter and the MIMO mode parameter. The fifth field carries N sidelink transmission parameters other than the indication information of the MCS parameter and the MIMO mode parameter in the N pieces of scheduling sub-information used to transmit second data.

For example, N CUEs are a CUE 1 and a CUE 2. If the network device determines that the MCS parameters and the MIMO mode parameters in the first scheduling information and the second scheduling information are the same, and determines that the sidelink time-frequency resources of all of the N pieces of scheduling sub-information in the second scheduling information are the same, the first field may be the MCS parameter and a MIMO mode parameter, and the fifth field may include a sidelink time-frequency resource 601 that is configured by the network device for the CUE 1 and the CUE 2 and that is used for sidelink transmission.

The second field may include a field 601, a field 602, and a field 603. The field 601 may include a downlink time-frequency resource 601 that is configured by the network device for the CUE 1 and that is used for downlink transmission and a third downlink transmission parameter 601', for example, a HARQ feedback parameter or a priority, other than the MCS parameter and the MIMO mode parameter. The field 602 may include a downlink time-frequency resource 602 that is configured by the network device for the CUE 2 and that is used for downlink transmission and a third downlink transmission parameter 602', for example, a HARQ feedback parameter or a priority, other than the MCS parameter and the MIMO mode parameter. The field 603 may include a downlink time-frequency resource 603 that is configured by the network device for the TUE and that is used for downlink transmission and a third downlink transmission parameter 603', for example, a HARQ feedback parameter or a priority, other than the MCS parameter and the MIMO mode parameter.

The sixth field may include a field 611 and a field 612. The field 611 may include a third sidelink transmission parameter 601', for example, a HARQ feedback parameter or a priority, that is other than the MCS parameter and the MIMO mode parameter, that is configured by the network device for the CUE 1, and that is used for sidelink transmission. The field 612 may include a third sidelink transmission parameter 602', for example, a HARQ feedback parameter or a priority, that is other than the MCS parameter and the MIMO mode parameter, that is configured by the network device for the CUE 2, and that is used for sidelink transmission.

The CUE 1 uses, based on the first field and the field 601 in the second field, the MCS parameter, the MIMO mode parameter, and the third downlink transmission parameter 601' as a downlink transmission parameter 601 used by the CUE 1 for downlink transmission. Then, the CUE 1 may receive, on the downlink time-frequency resource 601 by using the downlink transmission parameter 601, the first data sent by the network device.

The CUE 2 uses, based on the first field and the field 602 in the second field, the MCS parameter, the MIMO mode parameter, and the third downlink transmission parameter 602' as a downlink transmission parameter 602 used by the CUE 2 for downlink transmission. Then, the CUE 2 may receive, on the downlink time-frequency resource 602 by using the downlink transmission parameter 602, the first data sent by the network device.

If the TUE correctly receives the downlink control information, the TUE uses, based on the first field and the field 603 in the second field, the MCS parameter, the MIMO mode parameter, and the third downlink transmission parameter 603' as a downlink transmission parameter 603 used by the TUE for downlink transmission. Then, the TUE may receive, on the downlink time-frequency resource 603 by using the downlink transmission parameter 603, the first data sent by the network device.

For a process in which the CUE 1 generates second data 1 based on the first data and the CUE 2 generates second data 2 based on the first data, refer to the foregoing embodiment. Details are not described herein again.

The CUE 1 uses, based on the first field, the fifth field, and the field 611 in the sixth field, the MCS parameter, the MIMO mode parameter, and the third sidelink transmission parameter 601' as a sidelink transmission parameter 601 used by the CUE 1 for sidelink transmission. Then, the CUE 1 may send the second data 1 to the TUE on the sidelink time-frequency resource 601 by using the sidelink transmission parameter 601.

If the TUE correctly receives the downlink control information, the TUE uses, based on the first field, the fifth field, and the field 611 in the sixth field, the MCS parameter, the MIMO mode parameter, and the third sidelink transmission parameter 601' as a sidelink transmission parameter 601 used by the CUE 1 for sidelink transmission. Then, the TUE may receive, on the sidelink time-frequency resource 601 by using the sidelink transmission parameter 601, the second data 1 sent by the CUE 1.

In another possible implementation, the TUE uses, based on SCI that is delivered by the CUE 1 and that carries the first field, the fifth field, and the field 611, the MCS parameter, the MIMO mode parameter, and the third sidelink transmission parameter 601' as a sidelink transmission parameter 601 used by the CUE 1 for sidelink transmission. Then, the TUE may receive, on the sidelink time-frequency resource 601 by using the sidelink transmission parameter 601, the second data 1 sent by the CUE 1.

The CUE 2 uses, based on the first field, the fifth field, and the field 612 in the sixth field, the MCS parameter, the MIMO mode parameter, and the third sidelink transmission parameter 602' as a sidelink transmission parameter 602 used by the CUE 2 for sidelink transmission. Then, the CUE 2 may send the second data 2 to the TUE on the sidelink time-frequency resource 601 by using the sidelink transmission parameter 602.

If the TUE correctly receives the downlink control information, the TUE uses, based on the first field, the fifth field, and the field 612 in the sixth field, the MCS parameter, the MIMO mode parameter, and the third sidelink transmission parameter 602' as the sidelink transmission parameter 602 used by the CUE 2 for sidelink transmission. Then, the TUE may receive, on the sidelink time-frequency resource 601 by using the sidelink transmission parameter 602, the second data 2 sent by the CUE 2.

In another possible implementation, the TUE uses, based on SCI that is delivered by the CUE 2 and that carries the first field, the fifth field, and the field 612, the MCS parameter, the MIMO mode parameter, and the third sidelink transmission parameter 602' as the sidelink transmission parameter 602 used by the CUE 2 for sidelink transmission. Then, the TUE may receive, on the sidelink time-frequency resource 601 by using the sidelink transmission parameter 602, the second data 2 sent by the CUE 2.

In the foregoing implementation, a common part in the first scheduling information and the second scheduling information is deduplicated, and a common part in the second scheduling information is deduplicated, so that the overheads of the resource occupied by the downlink control information in user cooperation transmission can be reduced, to improve spectral efficiency. In addition, for a terminal device, decoding complexity is reduced, and power consumption of the terminal device is reduced.

It may be understood that, in the embodiments of this application, different examples may be used separately or may be used in combination. That the different examples are used separately or in combination falls within the protection scope of this application.

In the embodiments provided in this application, the methods provided in the embodiments of this application are described from perspectives of the network device, the terminal, and interaction between the network device and the terminal. To implement functions in the foregoing methods provided in the embodiments of this application, the network device and the terminal may include a hardware structure and/or a software module, and implement the foregoing functions in a form of the hardware structure, the software module, or a combination of the hardware structure and the software module. Whether a function of the foregoing functions is performed by using the hardware structure, the software module, or the combination of the hardware structure and the software module depends on a specific application and a design constraint condition of the technical solution.

Same as the foregoing concept, an embodiment of this application provides a communication apparatus. FIG. 6 is a schematic diagram of a structure of a communication apparatus according to an embodiment of this application. The communication apparatus 600 includes a transceiver module 610 and a processing module 620. The communication apparatus may be configured to implement a function of the first cooperation terminal device or the target terminal device in any one of the foregoing method embodiments. For example, the communication apparatus may be a terminal device, for example, a handheld terminal device or a vehicle-mounted terminal device. The communication apparatus may be a chip included in the terminal device or an apparatus including the terminal device, for example, various types of vehicles. The communication apparatus may alternatively be another combined device, a component, or the like that has the function of the foregoing terminal device. When the communication apparatus is the terminal device, the transceiver module may be a transceiver, and may include an antenna, a radio frequency circuit, and the like, and the processing module may be a processor, for example, a central processing unit (central processing unit, CPU). When the communication apparatus is the component having the function of the foregoing terminal device, the transceiver module may be a radio frequency unit, and the processing module may be a processor. When the communication apparatus is a chip system, the transceiver module may be an input/output interface of the chip system, and the processing module may be a processor of the chip system.

When the communication apparatus is used as a first cooperation terminal device, and the communication apparatus belongs to at least one cooperation terminal device, and performs the method embodiments shown in FIG. 2a to FIG. 2c, the transceiver module 610 is configured to receive downlink control information from a network device, where the downlink control information includes first scheduling information and second scheduling information, the first scheduling information indicates a downlink transmission parameter and a downlink time-frequency resource that are used by a target terminal device and the at least one cooperation terminal device to receive first data from the network device, the second scheduling information indicates a sidelink transmission parameter and a sidelink time-frequency resource that are used by the at least one cooperation terminal device to send second data to the target terminal device, the second data is generated based on the first data, and the target terminal device and the at least one cooperation terminal device belong to one cooperation transmission group.

The processing module 620 is configured to receive the first data from the network device based on the first scheduling information; and send the second data to the target terminal device based on the second scheduling information.

When the communication apparatus is used as a target terminal device, and performs the method embodiments shown in FIG. 2a to FIG. 2c, the transceiver module 610 is configured to receive downlink control information from a network device, where the downlink control information includes first scheduling information and second scheduling information, the first scheduling information indicates a downlink transmission parameter and a downlink time-frequency resource that are used by the target terminal device and at least one cooperation terminal device to receive first data from the network device, the second scheduling information indicates a sidelink transmission parameter and a sidelink time-frequency resource that are used by the at least one cooperation terminal device to send second data to the communication apparatus, the second data is generated based on the first data, the communication apparatus and the at least one cooperation terminal device belong to one cooperation transmission group, and a first cooperation terminal device is one of the at least one cooperation terminal device.

The processing module 620 is configured to receive the second data from the first cooperation terminal device based on the second scheduling information.

In a possible design, a quantity of the at least one cooperation terminal device may be N, and N is a positive integer. Correspondingly, the second scheduling information may include N pieces of scheduling sub-information, and each of the N pieces of scheduling sub-information correspondingly indicates a sidelink transmission parameter and a sidelink time-frequency resource of one of the N cooperation terminal devices.

In a possible design, the downlink control information may specifically include a first field, a second field, and a third field, where the first field indicates first common scheduling information, and the first common scheduling information is a same part in the first scheduling information and the second scheduling information; the second field indicates a part other than the first common scheduling information in the first scheduling information; and the third field indicates a part other than the first common scheduling information in the second scheduling information.

In another possible design, the downlink control information includes a fourth field, a first subfield, and a second subfield, where the fourth field indicates the first scheduling information; the first subfield indicates second common scheduling information, and the second common scheduling information is a same part in the N pieces of scheduling sub-information; and the second subfield indicates a part other than the second common scheduling information in the N pieces of scheduling sub-information.

In still another possible design, the downlink control information includes a first field, a second field, a fifth field, and a sixth field.

The first field indicates first common scheduling information, and the first common scheduling information is a same part in the first scheduling information and the second scheduling information; the second field indicates a part other than the first common scheduling information in the first scheduling information; the fifth field indicates a part other than the first common scheduling information in second common scheduling information, and the second common scheduling information is a same part in the N pieces of scheduling sub-information; and the sixth field is a part other than the first common scheduling information and the second common scheduling information in the second scheduling information.

In a possible design, the first scheduling information and the second scheduling information may each include but are not limited to one or more of the following: a modulation and coding scheme, a time-frequency resource, a multiple-input multiple-output mode, a hybrid automatic repeat request parameter, and priority information.

The processing module 620 in the communication apparatus may be implemented by a processor or a processor-related circuit component, and the transceiver module 610 may be implemented by a transceiver or a transceiver-related circuit component. Operations and/or functions of the modules in the communication apparatus are respectively used to implement corresponding procedures of the methods shown in FIG. 2a to FIG. 2c. For example, in FIG. 2a to FIG. 2c, if the communication apparatus is the first cooperation terminal device, the transceiver module 610 may be configured to perform step 203 and step 303, and the processing module 620 may be configured to perform step 204, step 205, step 304, and step 305. If the communication apparatus is the target terminal device, the transceiver module 610 may be configured to perform step 203 and step 303, and the processing module 620 may be configured to perform step 204, step 206, step 304, and step 306.

For specific execution processes of the processing module 620 and the transceiver module 610, refer to the descriptions in the foregoing method embodiments. Division into the modules in the embodiments of this application is an example, is only logical function division, and may be other division during actual implementation. In addition, function modules in the embodiments of this application may be integrated into one processor, or may exist alone physically, or two or more modules are integrated into one module. The integrated module may be implemented in a form of hardware, or may be implemented in a form of a software function module.

Figure 7:
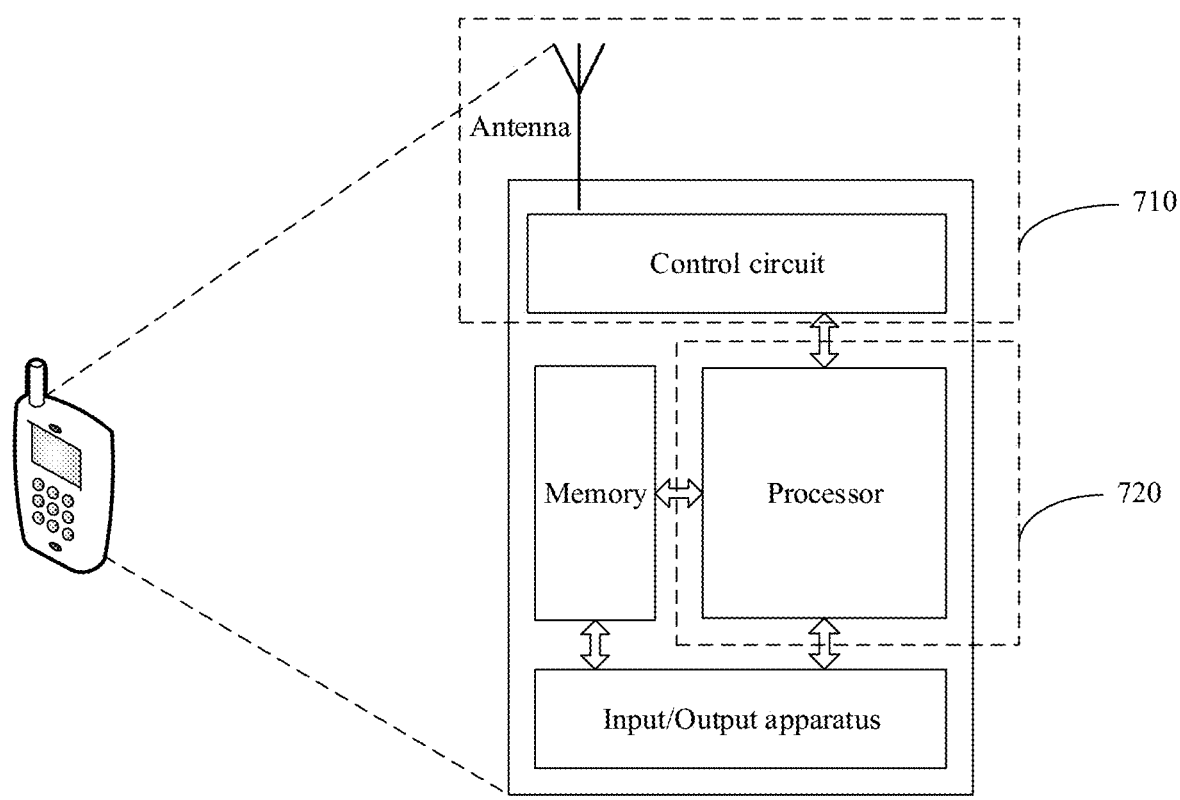
FIG. 7 is another schematic diagram of a structure of a communication apparatus according to an embodiment of this application.

FIG. 7 is another schematic diagram of a structure of a communication apparatus according to an embodiment of this application. The communication apparatus may be specifically a terminal device. For ease of understanding and convenience of figure illustration, an example in which the terminal device is a mobile phone is used in FIG. 7. As shown in FIG. 7, the terminal device includes a processor, and may further include a memory. In addition, the terminal device may further include a radio frequency circuit, an antenna, an input/output apparatus, and the like. The processor is mainly configured to: process a communication protocol and communication data, control the terminal device, execute a software program, process data of the software program, and the like. The memory is mainly configured to store a software program and data. The radio frequency circuit is mainly configured to: convert a baseband signal and a radio frequency signal, and process the radio frequency signal. The antenna panel is mainly configured to send and receive a radio frequency signal in an electromagnetic wave form. The input/output apparatus such as a touchscreen, a display screen, or a keyboard is mainly configured to receive data input by a user and output data to the user. It should be noted that some types of terminal devices may have no input/output apparatus.

When data needs to be sent, the processor performs baseband processing on to-be-sent data, and then outputs the baseband signal to the radio frequency circuit. After performing radio frequency processing on the baseband signal, the radio frequency circuit sends the radio frequency signal to the outside by using the antenna in an electromagnetic wave form. When data is sent to the terminal device, the radio frequency circuit receives the radio frequency signal through the antenna, converts the radio frequency signal into the baseband signal, and outputs the baseband signal to the processor. The processor converts the baseband signal into data, and processes the data. For ease of description, FIG. 7 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver module of the terminal device, and the processor that has a processing function may be considered as a processing module of the terminal device. That is, the first terminal device includes the transceiver module and the processing module. The transceiver module may also be referred to as a transceiver, a transceiver, a transceiver apparatus, or the like. The processing module may also be referred to as a processor, a processing board, a processing module, a processing apparatus, and the like. Optionally, a component for implementing a receiving function in the transceiver module may be considered as a receiving module, and a component for implementing a sending function in the transceiver module may be considered as a sending module. That is, the transceiver module includes the receiving module and the sending module. The transceiver module sometimes may also be referred to as a transceiver, a transceiver, a transceiver circuit, or the like. The receiving module sometimes may also be referred to as a receiver, a receiver, a receiver circuit, or the like. The sending module sometimes may also be referred to as a transmitter, a transmitter, a transmitter circuit, or the like. It should be understood that the transceiver module is configured to perform a sending operation and a receiving operation of the terminal device in the foregoing method embodiments, and the processing module is configured to perform an operation other than the sending operation and the receiving operation of the terminal device in the foregoing method embodiments.

Figure 8:
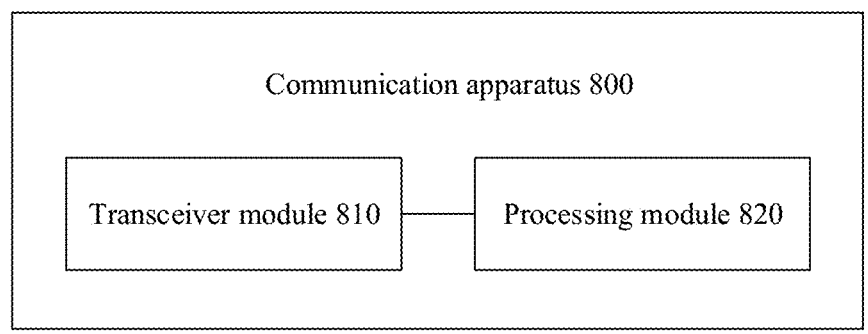
FIG. 8 is a schematic diagram of a structure of another communication apparatus according to an embodiment of this application.

An embodiment of this application further provides another communication apparatus. FIG. 8 is a schematic diagram of a structure of another communication apparatus according to an embodiment of this application. The communication apparatus 800 includes a transceiver module 810 and a processing module 820. The communication apparatus may be configured to implement the function of the network device in any one of the foregoing method embodiments. For example, the communication apparatus may be a network device or a chip included in the network device, or the communication apparatus may be another combined device, a component, or the like that has the function of the foregoing network device. When the communication apparatus is the network device, the transceiver module may be a transceiver, and may include an antenna, a radio frequency circuit, and the like, and the processing module may be a processor, for example, a central processing unit (central processing unit, CPU). When the communication apparatus is the component having the function of the foregoing network device, the transceiver module may be a radio frequency unit, and the processing module may be a processor. When the communication apparatus is a chip system, the transceiver module may be an input/output interface of the chip system, and the processing module may be a processor of the chip system.

When the communication apparatus is used as the network device, and performs the method embodiments shown in FIG. 2a to FIG. 2c, the transceiver module 810 is configured to send downlink control information to a target terminal device and at least one cooperation terminal device, where the downlink control information includes first scheduling information and second scheduling information.

The processing module 820 is configured to generate the first scheduling information and the second scheduling information, where the first scheduling information indicates a downlink transmission parameter and a downlink time-frequency resource that are used by the target terminal device and the at least one cooperation terminal device to receive first data from the network device, the second scheduling information indicates a sidelink transmission parameter and a sidelink time-frequency resource that are used by the at least one cooperation terminal device to send second data to the target terminal device, the target terminal device and the at least one cooperation terminal device belong to one cooperation transmission group, and the second data is generated based on the first data.

In a possible design, a quantity of the at least one cooperation terminal device may be N, and N is a positive integer. Correspondingly, the second scheduling information may include N pieces of scheduling sub-information, and each of the N pieces of scheduling sub-information correspondingly indicates a sidelink transmission parameter and a sidelink time-frequency resource of one of the N cooperation terminal devices.

In a possible design, the downlink control information may specifically include a first field, a second field, and a third field, where the first field indicates first common scheduling information, and the first common scheduling information is a same part in the first scheduling information and the second scheduling information; the second field indicates a part other than the first common scheduling information in the first scheduling information; and the third field indicates a part other than the first common scheduling information in the second scheduling information.

In another possible design, the downlink control information includes a fourth field, a first subfield, and a second subfield, where the fourth field indicates the first scheduling information; the first subfield indicates second common scheduling information, and the second common scheduling information is a same part in the N pieces of scheduling sub-information; and the second subfield indicates a part other than the second common scheduling information in the N pieces of scheduling sub-information.

In still another possible design, the downlink control information includes a first field, a second field, a fifth field, and a sixth field.

The first field indicates first common scheduling information, and the first common scheduling information is a same part in the first scheduling information and the second scheduling information; the second field indicates a part other than the first common scheduling information in the first scheduling information; the fifth field indicates a part other than the first common scheduling information in second common scheduling information, and the second common scheduling information is a same part in the N pieces of scheduling sub-information; and the sixth field is a part other than the first common scheduling information and the second common scheduling information in the second scheduling information.

In a possible design, the first scheduling information and the second scheduling information may each include but are not limited to one or more of the following: a modulation and coding scheme, a time-frequency resource, a multiple-input multiple-output mode, a hybrid automatic repeat request parameter, and priority information.

It should be understood that the processing module 820 in the communication apparatus may be implemented by a processor or a processor-related circuit component, and the transceiver module 810 may be implemented by a transceiver or a transceiver-related circuit component. Operations and/or functions of the modules in the communication apparatus are respectively used to implement corresponding procedures of the methods shown in FIG. 2a to FIG. 2c. For example, in FIG. 2a to FIG. 2c, the communication apparatus is used as the network device, the transceiver module 810 may be configured to perform step 202 and step 302, and the processing module 820 may be configured to perform step 201 and step 301. For brevity, examples are not listed one by one herein.

Figure 9:
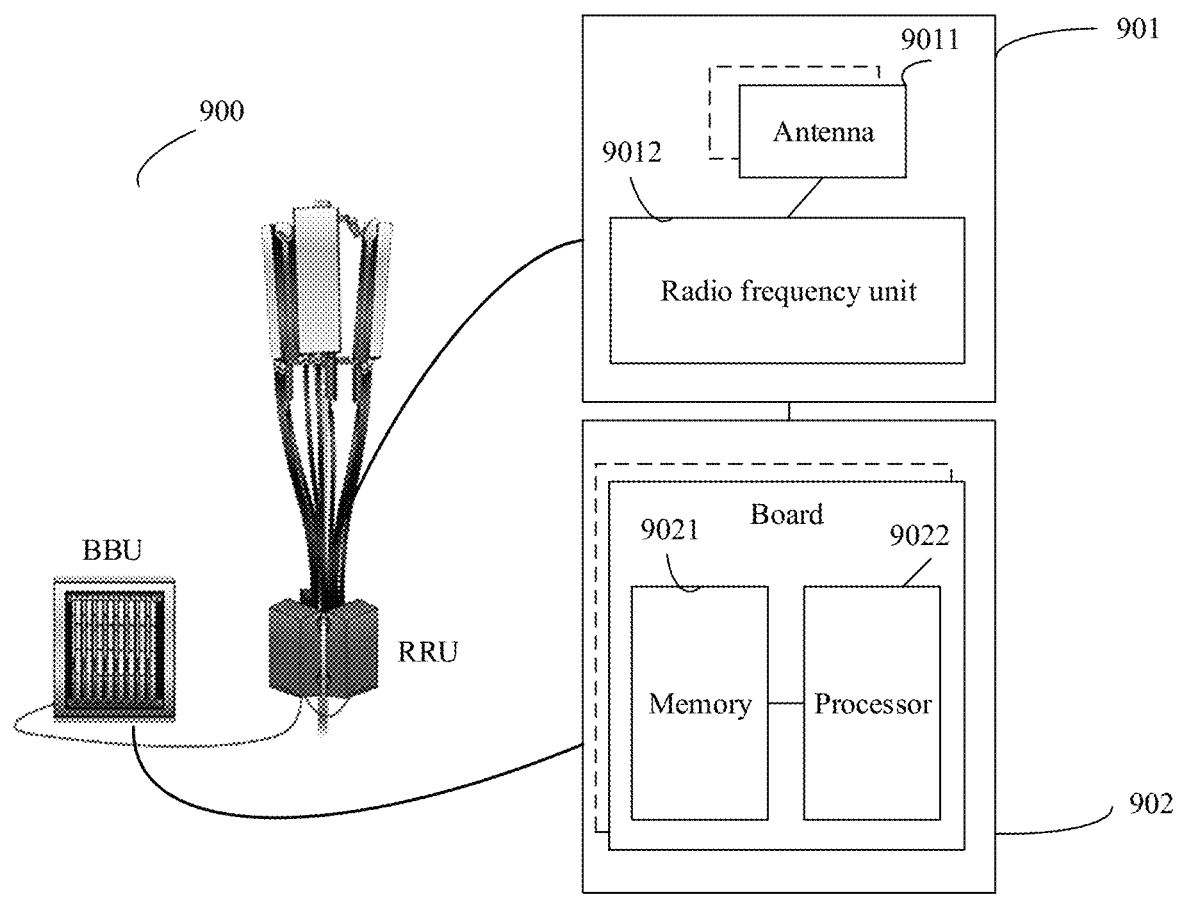
FIG. 9 is another schematic diagram of a structure of another communication apparatus according to an embodiment of this application.

FIG. 9 is another schematic diagram of a structure of another communication apparatus according to an embodiment of this application. The communication apparatus may be specifically a network device, for example, a base station, configured to implement the function of the network device in any one of the foregoing method embodiments.

The network device includes one or more radio frequency units such as a remote radio unit (remote radio unit, RRU) 901 and one or more baseband units (baseband unit, BBU) (which may also be referred to as a digital unit, digital unit, DU) 902. The RRU 901 may be referred to as a transceiver unit, a transceiver, a transceiver circuit, a transceiver, or the like, and may include at least one antenna 9011 and a radio frequency unit 9012. The RRU 901 is mainly configured to send and receive radio frequency signals and perform conversion between a radio frequency signal and a baseband signal. The BBU 902 is mainly configured to: perform baseband processing, control the base station, and so on. The RRU 901 and the BBU 902 may be physically disposed together, or may be physically separated, that is, the base station is a distributed base station.

The BBU 902 is a control center of the base station, may also be referred to as a processing module, and is mainly configured to implement baseband processing functions such as channel coding, multiplexing, modulation, and spectrum spreading. For example, the BBU (the processing module) 902 may be configured to control the base station to perform an operation procedure related to the network device in the method embodiments.

In an example, the BBU 902 may include one or more boards, and a plurality of boards may jointly support a radio access network (for example, an LTE network) having a single access standard, or may separately support radio access networks (for example, the LTE network, a 5G network, or another network) having different access standards. The BBU 902 may further include a memory 9021 and a processor 9022. The memory 9021 is configured to store necessary instructions and data. The processor 9022 is configured to control the base station to perform a necessary action, for example, is configured to control the base station to perform a sending operation in the foregoing method embodiments. The memory 9021 and the processor 9022 may serve one or more boards. In other words, the memory and the processor may be separately disposed on each board. Alternatively, the plurality of boards may share a same memory and processor. In addition, a necessary circuit may be further disposed on each board.

An embodiment of this application further provides a chip system, including a processor, where the processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be respectively disposed on different chips. A type of the memory and a manner of disposing the memory and the processor are not specifically limited in this application.

For example, the chip system may be a field programmable gate array (field programmable gate array, FPGA), an application specific integrated circuit (application specific integrated circuit, ASIC), a system on chip (system on chip, SoC), a central processing unit (central processing unit, CPU), a network processor (network processor, NP), a digital signal processing circuit (digital signal processor, DSP), a micro controller unit (micro controller unit, MCU), or a programmable controller (programmable logic device, PLD), or another integrated chip.

It should be understood that steps in the foregoing method embodiments may be implemented by using a hardware integrated logical circuit in the processor or instructions in a form of software. The steps of the methods disclosed with reference to the embodiments of this application may be directly performed and completed by a hardware processor, or may be performed and completed by using a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a network device and at least one terminal device.

It should be understood that, the processor mentioned in the embodiments of this application may be a central processing unit (central processing unit, CPU), or may be another general purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logical device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on implementation processes of the embodiments of the present invention.

A person of ordinary skill in the art may be aware that, in combination with the examples described in the embodiments disclosed in this specification, units and algorithm steps can be implemented by electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, each unit may exist alone physically, or two or more units are integrated into one unit.

When the functions are implemented in a form of a software functional unit and sold or used as an independent product, the functions may be stored in a computer-readable storage medium. Based on such an understanding, the technical solutions provided in the embodiments of this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   generating, by a network device, first scheduling information and second scheduling information, wherein the first scheduling information indicates a downlink transmission parameter and a downlink time-frequency resource that are used by a target terminal device and at least one cooperation terminal device to receive first data from the network device, the second scheduling information indicates a sidelink transmission parameter and a sidelink time-frequency resource that are used by the at least one cooperation terminal device to send second data to the target terminal device, the target terminal device and the at least one cooperation terminal device belong to one cooperation transmission group, and the second data is generated based on the first data; and sending, by the network device, downlink control information to the target terminal device and the at least one cooperation terminal device, wherein the downlink control information comprises the first scheduling information and the second scheduling information;

wherein a quantity of the at least one cooperation terminal device is N, N is a positive integer, the second scheduling information comprises N pieces of scheduling sub-information, and each of the N pieces of scheduling sub-information correspondingly indicates a sidelink transmission parameter and a sidelink time-frequency resource of each of the at least one cooperation terminal device.

2. The method according to claim 1, wherein the second scheduling information indicates a first sidelink transmission parameter and a first sidelink time-frequency resource, and the first sidelink transmission parameter and the first sidelink time-frequency resource are used by each of the at least one cooperation terminal device to send the second data.

3. The method according to claim 1, wherein the downlink control information comprises a first field, a second field, and a third field, and wherein:

the first field indicates first common scheduling information, and the first common scheduling information is a same part in the first scheduling information and the second scheduling information;

the second field indicates a part other than the first common scheduling information in the first scheduling information; and the third field indicates a part other than the first common scheduling information in the second scheduling information.

4. The method according to claim 1, wherein the downlink control information comprises a fourth field, a first subfield, and a second subfield, and wherein:

the fourth field indicates the first scheduling information;

the first subfield indicates second common scheduling information, and the second common scheduling information is a same part in the N pieces of scheduling sub-information; and the second subfield indicates a part other than the second common scheduling information in the N pieces of scheduling sub-information.

5. A communication method, wherein the method comprises:

receiving, by a target terminal device, downlink control information from a network device, wherein the downlink control information comprises first scheduling information and second scheduling information, the first scheduling information indicates a downlink transmission parameter and a downlink time-frequency resource that are used by the target terminal device and at least one cooperation terminal device to receive first data from the network device, the second scheduling information indicates a sidelink transmission parameter and a sidelink time-frequency resource that are used by the at least one cooperation terminal device to send second data to the target terminal device, and the target terminal device and the at least one cooperation terminal device belong to one cooperation transmission group; and receiving, by the target terminal device, the second data from a first cooperation terminal device based on the second scheduling information, wherein the first cooperation terminal device is one of the at least one cooperation terminal device, and the second data is generated based on the first data;

wherein a quantity of the at least one cooperation terminal device is N, N is a positive integer, the second scheduling information comprises N pieces of scheduling sub-information, and each of the N pieces of scheduling sub-information correspondingly indicates a sidelink transmission parameter and a sidelink time-frequency resource of each of the at least one cooperation terminal device.

6. The method according to claim 5, wherein the method further comprises:

receiving, by the target terminal device, the first data from the network device based on the first scheduling information.

7. The method according to claim 5, wherein the second scheduling information indicates a first sidelink transmission parameter and a first sidelink time-frequency resource, and the first sidelink transmission parameter and the first sidelink time-frequency resource are used by the target terminal device to receive the second data from the first cooperation terminal device.

8. The method according to claim 5, wherein the downlink control information comprises a first field, a second field, and a third field, and wherein:

the first field indicates first common scheduling information, and the first common scheduling information is a same part in the first scheduling information and the second scheduling information;

the second field indicates a part other than the first common scheduling information in the first scheduling information; and the third field indicates a part other than the first common scheduling information in the second scheduling information.

9. A communication apparatus, comprising:

a transceiver;

at least one processor;

a non-transitory computer readable medium storing instructions that, when executed by the at least one processor, cause the communication apparatus to perform operations comprising:

generating first scheduling information and second scheduling information, wherein the first scheduling information indicates a downlink transmission parameter and a downlink time-frequency resource that are used by a target terminal device and at least one cooperation terminal device to receive first data from the communication apparatus, the second scheduling information indicates a sidelink transmission parameter and a sidelink time-frequency resource that are used by the at least one cooperation terminal device to send second data to the target terminal device, the target terminal device and the at least one cooperation terminal device belong to one cooperation transmission group, and the second data is generated based on the first data; and sending, by the transceiver, downlink control information to the target terminal device and the at least one cooperation terminal device, wherein the downlink control information comprises the first scheduling information and the second scheduling information;

wherein a quantity of the at least one cooperation terminal device is N, N is a positive integer, the second scheduling information comprises N pieces of scheduling sub-information, and each of the N pieces of scheduling sub-information correspondingly indicates a sidelink transmission parameter and a sidelink time-frequency resource of each of the at least one cooperation terminal device.

10. The apparatus according to claim 9, wherein the second scheduling information indicates a first sidelink transmission parameter and a first sidelink time-frequency resource, and the first sidelink transmission parameter and the first sidelink time-frequency resource are used by each of the at least one cooperation terminal device to send the second data.

11. The apparatus according to claim 9, wherein the downlink control information comprises a first field, a second field, and a third field, and wherein:
the first field indicates first common scheduling information, and the first common scheduling information is a same part in the first scheduling information and the second scheduling information;
the second field indicates a part other than the first common scheduling information in the first scheduling information; and
the third field indicates a part other than the first common scheduling information in the second scheduling information.

12. The apparatus according to claim 9, wherein the downlink control information comprises a fourth field, a first subfield, and a second subfield, and wherein:
the fourth field indicates the first scheduling information;
the first subfield indicates second common scheduling information, and the second common scheduling information is a same part in the N pieces of scheduling sub-information; and
the second subfield indicates a part other than the second common scheduling information in the N pieces of scheduling sub-information.

13. A communication apparatus, comprising:
a transceiver;
at least one processor;
a non-transitory computer readable medium storing instructions that, when executed by the at least one processor, cause the communication apparatus to perform operations comprising:
receiving downlink control information from a network device, wherein the downlink control information comprises first scheduling information and second scheduling information, the first scheduling information indicates a downlink transmission parameter and a downlink time-frequency resource that are used by the communication apparatus and at least one cooperation terminal device to receive first data from the network device, the second scheduling information indicates a sidelink transmission parameter and a sidelink time-frequency resource that are used by the at least one cooperation terminal device to send second data to the communication apparatus, and the communication apparatus and the at least one cooperation terminal device belong to one cooperation transmission group; and
receiving, by the transceiver, the second data from a first cooperation terminal device based on the second scheduling information, wherein the first cooperation terminal device is one of the at least one cooperation terminal device, and the second data is generated based on the first data;
wherein a quantity of the at least one cooperation terminal device is N, N is a positive integer, the second scheduling information comprises N pieces of scheduling sub-information, and each of the N pieces of scheduling sub-information correspondingly indicates a sidelink transmission parameter and a sidelink time-frequency resource of each of the at least one cooperation terminal device.

14. The apparatus according to claim 13, wherein the operations further comprise receiving, by the transceiver, the first data from the network device based on the first scheduling information.

15. The apparatus according to claim 13, wherein the second scheduling information indicates a first sidelink transmission parameter and a first sidelink time-frequency resource, and the first sidelink transmission parameter and the first sidelink time-frequency resource are used by the communication apparatus to receive the second data from the first cooperation terminal device.

16. The apparatus according to claim 13, wherein the downlink control information comprises a first field, a second field, and a third field, and wherein:
the first field indicates first common scheduling information, and the first common scheduling information is a same part in the first scheduling information and the second scheduling information;
the second field indicates a part other than the first common scheduling information in the first scheduling information; and
the third field indicates a part other than the first common scheduling information in the second scheduling information.

* * * * *